(12) United States Patent
Havener

(10) Patent No.: US 12,312,158 B2
(45) Date of Patent: May 27, 2025

(54) REFRIGERATOR BOX AND METHOD OF USING SAME

(71) Applicant: Havener Enterprises, Inc., Bradley, IL (US)

(72) Inventor: Christopher Havener, Bradley, IL (US)

(73) Assignee: HAVENER ENTERPRISES, INC., Bradley, IL (US)

(*) Notice: Subject to any disclaimer, the term of this patent is extended or adjusted under 35 U.S.C. 154(b) by 0 days.

(21) Appl. No.: 18/610,899

(22) Filed: Mar. 20, 2024

(65) Prior Publication Data
US 2024/0327146 A1  Oct. 3, 2024

Related U.S. Application Data

(60) Provisional application No. 63/455,382, filed on Mar. 29, 2023.

(51) Int. Cl.
| | |
|---|---|
| *B65D 88/54* | (2006.01) |
| *B60P 1/43* | (2006.01) |
| *B65D 88/74* | (2006.01) |
| *B65D 90/18* | (2006.01) |
| *B60P 3/20* | (2006.01) |

(52) U.S. Cl.
CPC ............ *B65D 88/542* (2013.01); *B60P 1/431* (2013.01); *B60P 3/20* (2013.01); *B65D 88/745* (2013.01); *B65D 90/18* (2013.01)

(58) Field of Classification Search
CPC .......... B60P 1/431; B60P 3/20; B65D 88/542; B65D 88/74; B65D 88/745; B65D 2588/74; B65D 2588/745
See application file for complete search history.

(56) References Cited

U.S. PATENT DOCUMENTS

| | | | |
|---|---|---|---|
| 3,511,393 A | 5/1970 | Abromavage et al. | |
| 4,722,109 A | 2/1988 | Mountz | |
| 4,854,460 A * | 8/1989 | Josephs | B65D 88/121 220/1.5 |
| 5,467,855 A | 11/1995 | Sorensen | |
| 5,472,306 A | 12/1995 | Stoll et al. | |
| 5,897,285 A | 4/1999 | Wanderscheid et al. | |
| 7,703,835 B2 * | 4/2010 | Weeda | B60P 3/20 296/146.1 |
| 7,819,619 B2 | 10/2010 | Cassway et al. | |
| 10,974,582 B2 * | 4/2021 | Hara | B60P 1/431 |
| 11,104,239 B1 * | 8/2021 | Vollmer | B65D 88/542 |
| 12,007,157 B2 * | 6/2024 | Hibbert-Garibaldi | B65D 88/542 |
| 2009/0064428 A1 * | 3/2009 | Hoffman | B65D 88/542 14/71.1 |

FOREIGN PATENT DOCUMENTS

| | | | | |
|---|---|---|---|---|
| DE | 202019104504 U1 * | 6/2020 | ........... | B65D 88/542 |
| GB | 1584253 A * | 2/1981 | ............. | B60P 1/431 |
| GB | 2291396 A * | 1/1996 | ............. | B60P 1/431 |

\* cited by examiner

*Primary Examiner* — James Keenan
(74) *Attorney, Agent, or Firm* — KNECHTEL, DEMEUR & SAMLAN

(57) ABSTRACT

A stand-alone, all-in-one refrigerator box and, more particularly, to a refrigerator box that provides a built-in ramp that is moveable between a stowaway position and an angled position in connection with the refrigerator box for loading and unloading the refrigerator box without having to disengage the ramp while the refrigerator door is being opened and closed.

7 Claims, 24 Drawing Sheets

Figure 5:
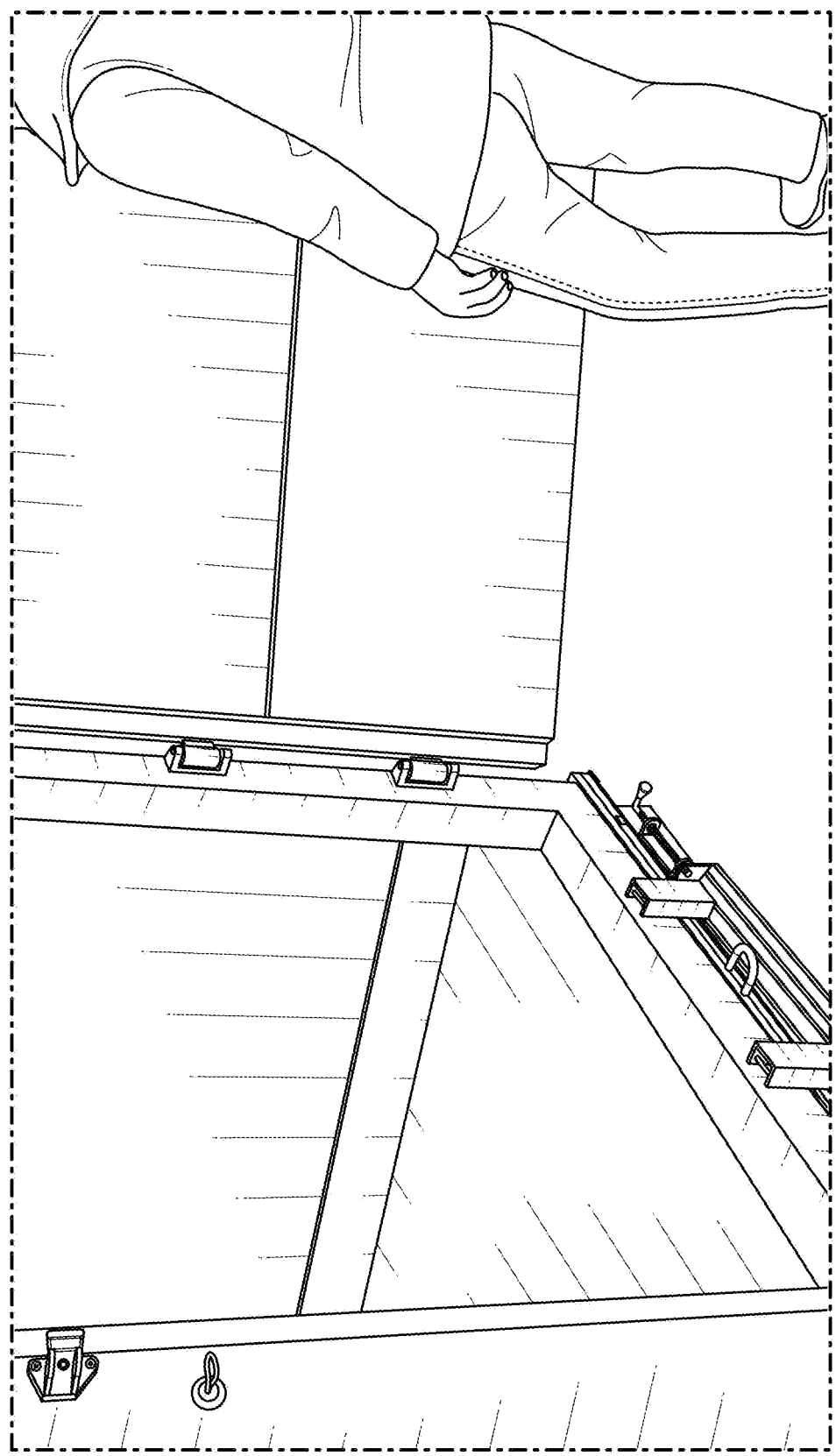

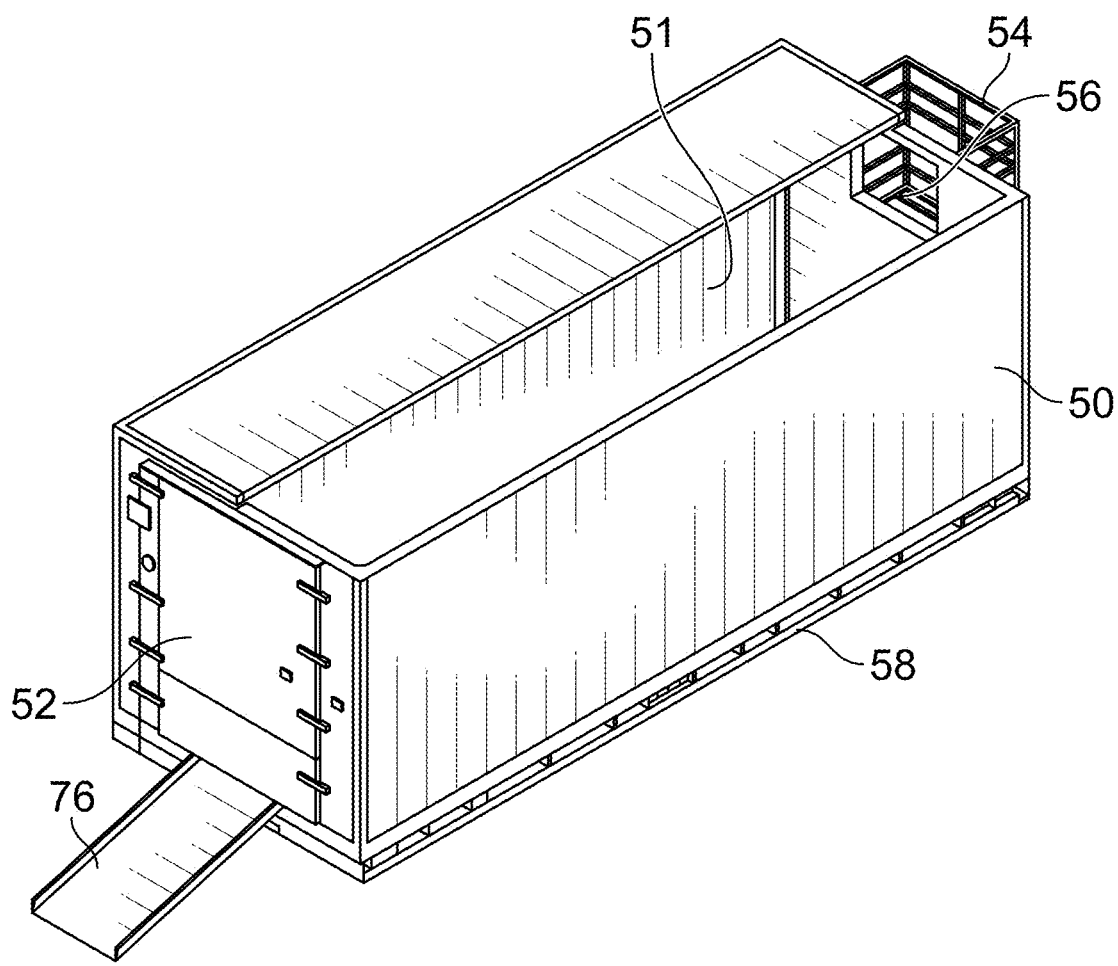
FIG. 1.1
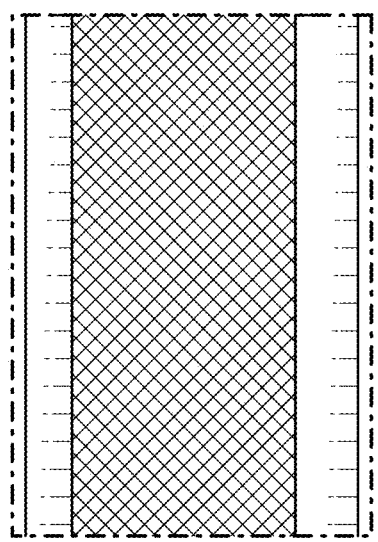
FIG. 1.2

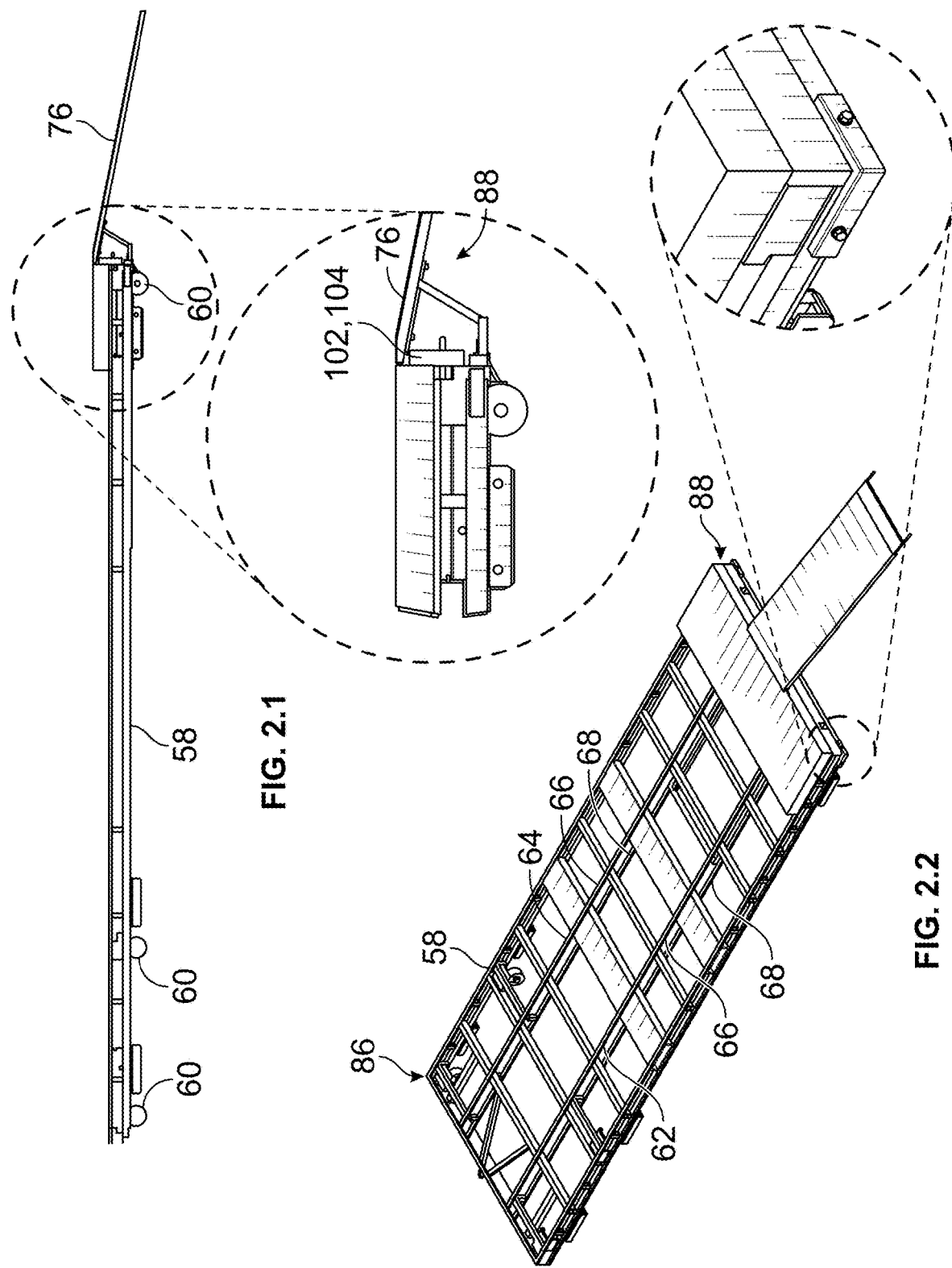

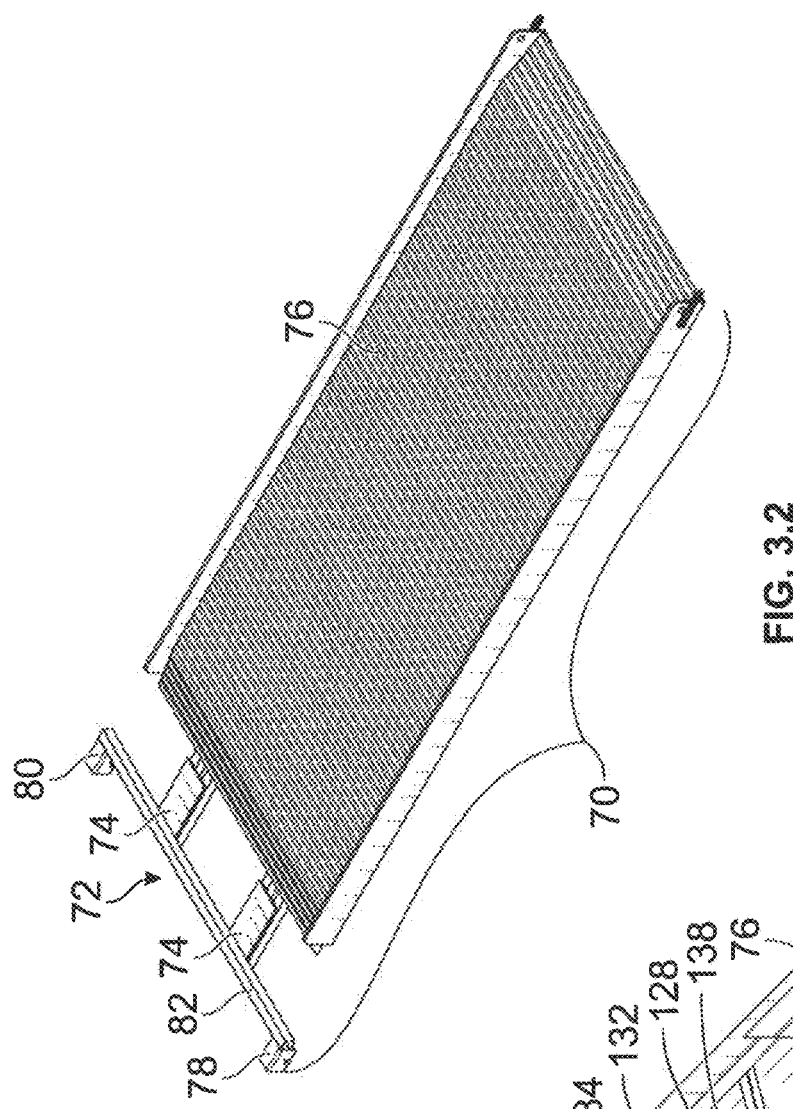
FIG. 3.2
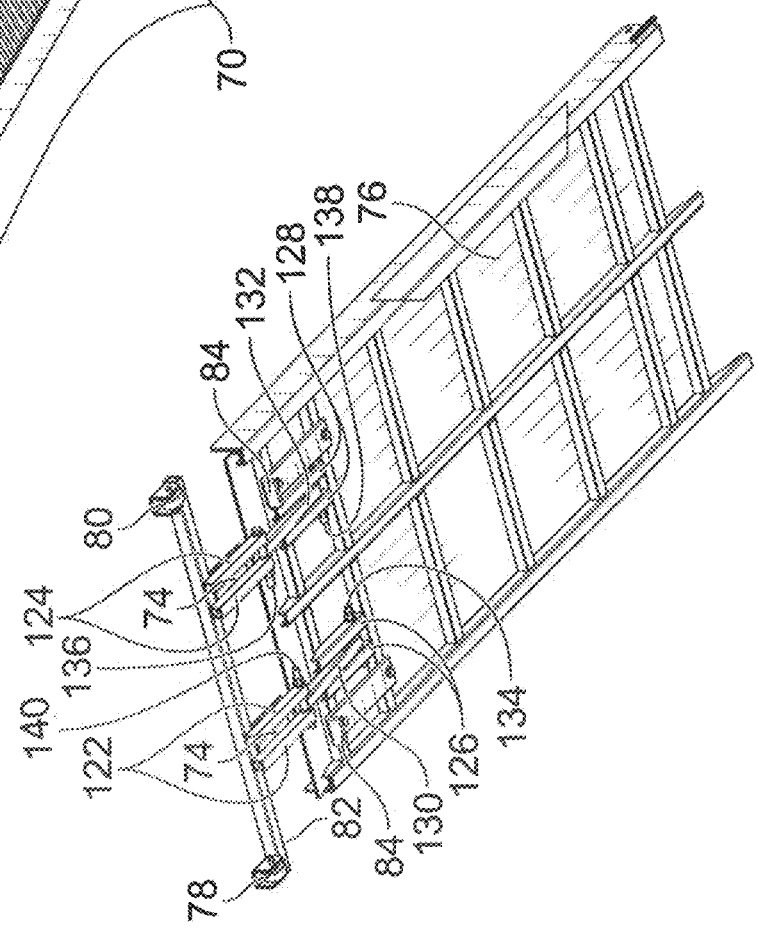
FIG. 3.1

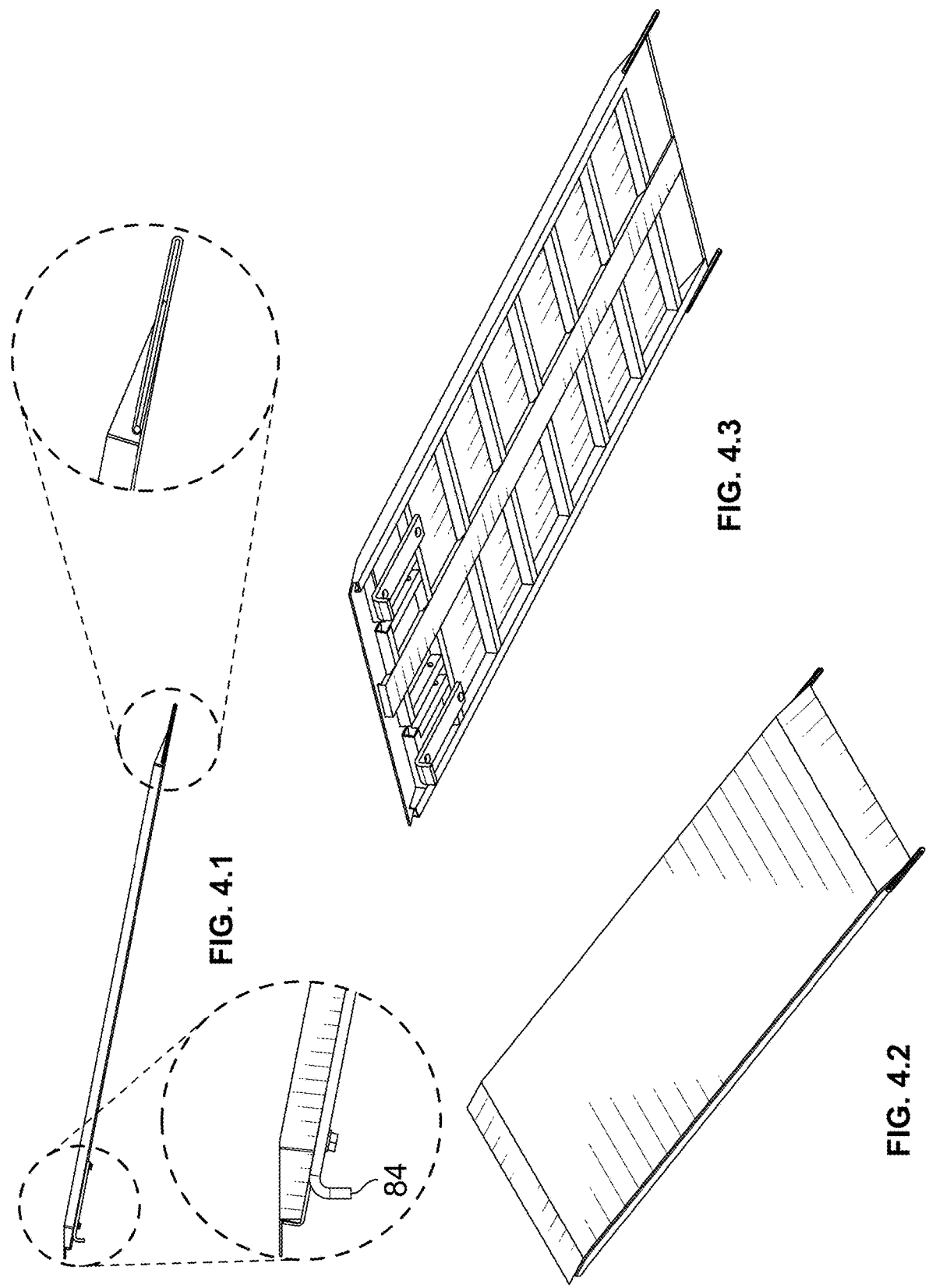

REFRIGERATOR BOX AND METHOD OF USING SAME

I. CROSS-REFERENCE TO RELATED APPLICATION

This patent application is a non-provisional application claiming priority from U.S. Provisional Patent Application Ser. No. 63/455,382, entitled "Refrigerator Box and Method of Using Same", filed on Mar. 29, 2023, and is fully incorporated herein by reference.

II. FIELD OF THE INVENTION

The present invention relates to stand-alone, all-in-one refrigerator box and, more particularly, to a refrigerator box that provides a built-in ramp that is moveable between a stowaway position and an angled position in connection with the refrigerator box for loading and unloading the refrigerator box without having to disengage the ramp while the refrigerator door is being opened and closed.

III. BACKGROUND OF THE INVENTION

Ramps for trailer trucks or semi-trailer trucks, also known as a semitruck, (or semi, eighteen-wheeler, big rig, tractor-trailer or, by synecdoche, a semitrailer), cargo boxes, etc. . . . have been known in the art for a very long time. In all of that time, while there are, or have been, various ramp or ramp assemblies invented and/or in the prior art, each of these currently available devices and as further discussed below, were designed to solve a completely different problem or are for use in connection with the trailers after or when the doors are open. For example, U.S. Pat. No. 5,467,855 entitled "Ramp Weight-Reducing Assembly" discloses a ramp weight-reducing assembly which reduces the weight of a ramp manually lifted up to the working surface of a vehicle bed by an operator to then couple the ramp with the bed to maintain the ramp in load-bearing position.

U.S. Pat. No. 5,897,285 entitled "Low Profile Loading Ramp" discloses a cargo truck is provided having a loading ramp assembly to aid in loading and unloading items from a cargo box on the truck. The loading ramp assembly is adjustable between a loading position wherein a ramp is provided between a deck of the cargo box and the ground, and a storage position to allow transport of the cargo truck. The loading ramp fits within a pocket between the truck frame and the cargo box when in the storage position.

U.S. Pat. No. 7,819,619 entitled "Retractable Ramp System" discloses a retractable ramp system having a slideable ramp between lateral rail members which extend the length of a truck chassis and a container mounted thereon. The ramp is inserted into corresponding opening in the bumper of the container for loading and off-loading containers which rest on the truck chassis or which are elevated above the chassis.

U.S. Pat. No. 4,722,109 entitled "Ramp For Trucks And The Like" discloses a ramp for trucks and the like is disclosed for use with a truck body, which includes parallel spaced rails extending longitudinally of the truck, secured to the truck chassis, of the I-beam type, carrying at least one trolley which is movable longitudinally in a track formed by the rails, which supports a carriage which is connected to side frame bars which are pivotally connected to the ramp, the carriage being positioned when the forward end of the ramp exits the truck body, so as to assist hooks on the forward end of the ramp to engage in openings in the truck body, while the rear end of the ramp rests on the ground.

U.S. Pat. No. 5,472,306 entitled "Retractable Vehicle Ramp With Lift Assist" discloses a retractable ramp mechanism for a vehicle includes a frame mounted to the vehicle and a ramp mounted to the frame by way of a linkage for movements between stowed and extended positions. The linkage is constructed and arranged to permit an inner end of the ramp to pivot upwardly with respect to the frame from a lower position to an engagement position. In the engagement position, the inner end of the ramp may be engaged with a work surface of the vehicle. The linkage includes a mechanism for applying a biasing force to bias the inner end of the ramp upwardly to the engagement position when the ramp is in the extended position.

U.S. Pat. No. 3,511,393 entitled "Ramp Assembly" discloses a ramp assembly having an inner or rear end of the ramp having a pair of hooks which are engageable with complemental brackets within the truck bed to place the ramp in the inclined position.

In all of this time, while the various ramp or ramp assemblies disclosed in the above-identified patents and maybe currently available, the current issue remains unresolved as they provide a ramp, trailer/container, and various similar ways for storing and removing a ramp from the trailer/container for use which solves a completely different problem and/or are for use in connection with the trailers after or when the doors are open; but, none of them disclose being able to continuously use the ramp or ramp assemblies while permitting or allowing the door to the trailer/container to be opened and closed while the ramp or ramp assemblies are in use.

Applicant, on the other hand, has solved this problem. Thus, there is a need, therefore, and there has never been disclosed Applicant's unique refrigerator box and method of using the same.

IV. SUMMARY OF INVENTION

The present invention is stand-alone, all-in-one refrigerator box and, more particularly, to a refrigerator box that provides a built-in ramp that is moveable between a stowaway position and an angled position in connection with the refrigerator box for loading and unloading the refrigerator box without having to disengage the ramp while the refrigerator door is being opened and closed.

V. BRIEF DESCRIPTION OF THE DRAWINGS

Description of the Preferred Embodiment will be better understood with reference to the following figures:

FIG. 1.1 is a perspective view of Applicant's inventive refrigerator box and, in particular, illustrating the components and assembly of the refrigerator box in accordance with the present invention.

FIG. 1.2 is a partial view, with portions removed, of Applicant's inventive refrigerator box in accordance with the present invention.

FIG. 2.1 is a side view of Applicant's inventive refrigerator box and, in particular, illustrating the components and assembly of the refrigerator box in accordance with the present invention.

FIG. 2.2 is a perspective view of Applicant's inventive refrigerator box and, in particular, illustrating the components and assembly of the refrigerator box in accordance with the present invention.

FIG. 3.1 is a bottom perspective view of Applicant's inventive refrigerator box and, in particular, illustrating the ramp used in connection with the refrigerator box in accordance with the present invention.

FIG. 3.2 is a top perspective view of Applicant's inventive refrigerator box and, in particular, illustrating the ramp used in connection with the refrigerator box in accordance with the present invention.

FIG. 4.1 is a side perspective view of Applicant's inventive refrigerator box and, in particular, illustrating the ramp used in connection with the refrigerator box in accordance with the present invention.

FIG. 4.2 is a top perspective view of Applicant's inventive refrigerator box and, in particular, illustrating the ramp used in connection with the refrigerator box in accordance with the present invention.

FIG. 4.3 is a bottom perspective view of Applicant's inventive refrigerator box and, in particular, illustrating the ramp used in connection with the refrigerator box in accordance with the present invention.

FIGS. 5 through 24 are a perspective view of Applicant's inventive refrigerator box and, in particular, illustrating the process and method of using Applicant's invention in accordance with the present invention.

VI. DETAILED DESCRIPTION OF THE PREFERRED EMBODIMENT

While this invention is susceptible of embodiment in many different forms, there is shown in the drawings and described herein in detail specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings with like reference characters. It will be further understood that FIGS. 1-24 are merely schematic representations of the device and some of the components may have been distorted from their actual scale for pictorial clarity.

In accordance with the present invention, and referring to FIGS. 1.1 and 1.2, the refrigerator box 50 is illustrated. The refrigerator box 50 is preferably a stand-alone, all-in-one refrigerator provided in a box configuration and having doors 52 situated at one end of the refrigerator box 50. The refrigerator box 50 is used for storing food and drink (e.g., products or contents) and keeping those products or contents in cold or cool temperatures.

An external frame 54 is attached to the refrigerator box 50 adjacent an opening 56 within the refrigerator box 50 such that an air-conditioning unit may be retained within the external frame to allow and permit force air cooling through the opening 56 and into the refrigerator box 50 to keep the products or contents cold or cool within the inside 51 of the refrigerator box 50.

Situated underneath or on the bottom, but an integral part of the refrigerator box 50, is a storage compartment 58, and also as more fully or clearly illustrated in FIGS. 2.1 and 2.2. Refrigerator box wheels 60 are used to enable the stand-alone, all-in-one refrigerator to be moved or transported (e.g., for example, to and from location where refrigerator box 50 is packed or loaded with the products or contents, for moving onto a truck bed or other trailer for transporting the refrigerator box 50 to the destination or location for delivery, and to and from the truck bed or other trailer and the destination or location where products or contents contained within the refrigerator box 50 are to be delivered and unloaded).

Within the storage compartment 58 are parallel, opposing tracks 62, 64. Each of these opposing tracks 62, 64 run longitudinally from one end to the other of the storage compartment 58. In the preferred embodiment, the opposing tracks 62, 64 are centered within the storage compartment 58, although any position of the opposing tracks 62, 64 will work in Applicant's invention provided the opposing tracks 62, 64 work as described herein. Also, in the preferred embodiment, each opposing tracks 62, 64 has a top rail 66 and a bottom rail 68.

A built-in ramp assembly 70 is further contained within the storage compartment 58, as illustrated in FIGS. 3.1 and 3.2, 4.1 and 4.2. In the preferred embodiment, the ramp assembly 70 comprises a head frame 72, articulating arms 74, and a ramp 76 having hooks 84, and is moveable within the storage compartment 58.

The head frame 72 comprises a head frame wheels 78, 80 connected by a frame member 82. In the preferred embodiment, the head frame wheels 78, 80 and as further illustrated below, are situated within the opposing tracks 62, 64, respectively, and specifically between the top rail 66 and bottom rail 68, respectively. In this manner, and as further discussed below, the head frame wheels 78, 80 are moveable (e.g., slide, roll, etc. . . . ) within the tracks 62, 64 to traverse or move the ramp assembly 70 through the storage compartment 58; and, as further discussed below, this is to facilitate the movement of the ramp assembly 70 between a stowaway position 86 (e.g., when the ramp assembly 70 is fully stored within the storage compartment 58 of the refrigerator box 50) and an angled position 88 (e.g., when the ramp assembly 70 is removed from the storage compartment 58) and situated in connection with the refrigerator box 50 below the doors 52 for loading and unloading the refrigerator box 50 without having to disengage the ramp while the refrigerator doors 52 are being opened and closed. The articulating arms 74, as described in more detail below, are preferably integrally connected between the frame member 82 of the head frame 72 and the ramp 76, and provide a first pair of arms 122, a second pair of arms 124, a third pair of arms 126, a fourth pair of arms 128, a fifth arm 130, and a sixth arm 132, and further providing a first pivot axis [132] 140, a second pivot axis 134, a third pivot axis 136, and a fourth pivot axis 138.

As illustrated in FIGS. 5 through 24, the process and method of using Applicant's invention in accordance with the present invention is more fully illustrated.

In FIG. 5, and in the preferred embodiment, the doors 52 may remain closed to keep the products and contents cold or cool within the refrigerator box 50. Alternatively, if desired, and for a short period of time, the doors 52 could likewise be opened.

Figure 6:
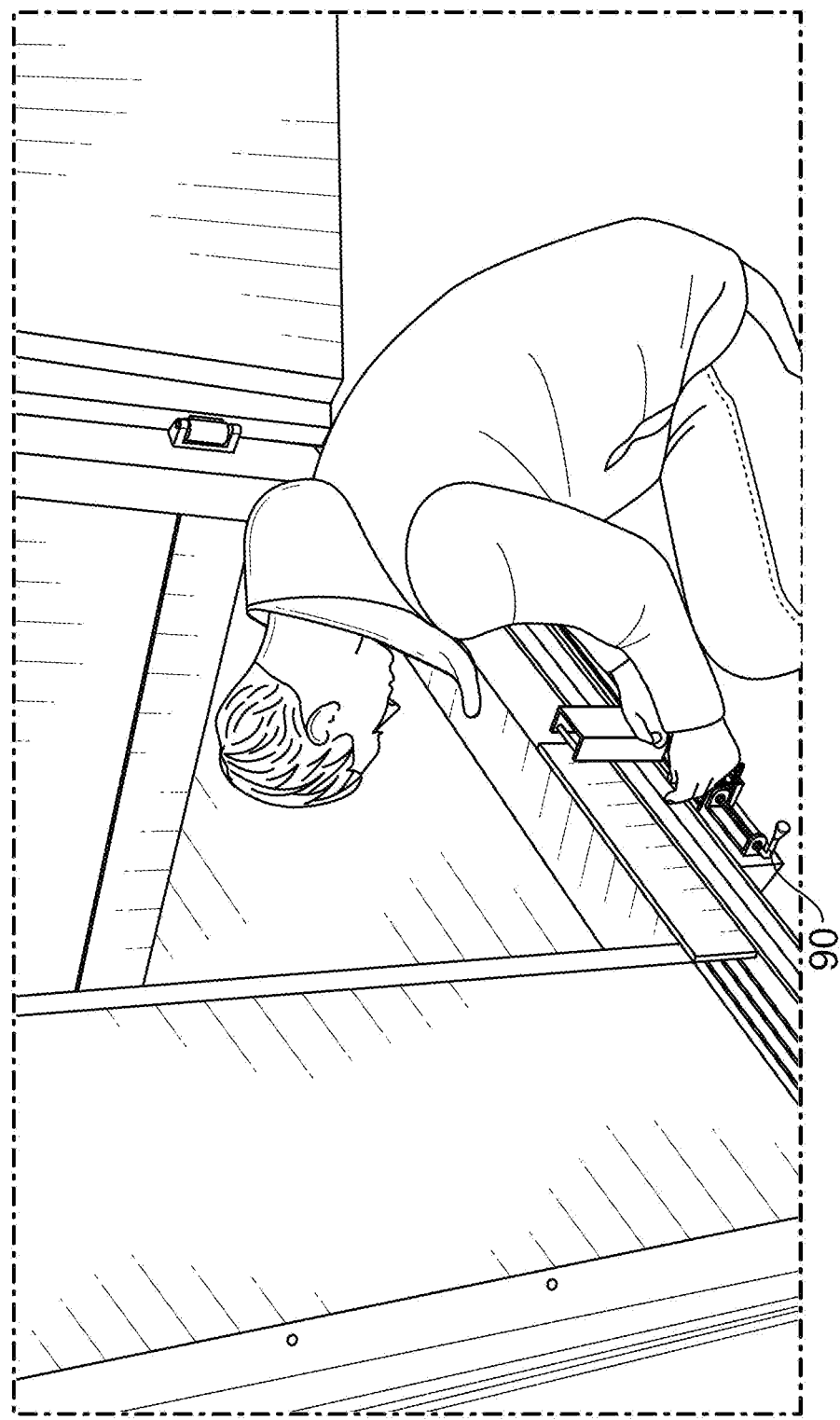
Figure 7:
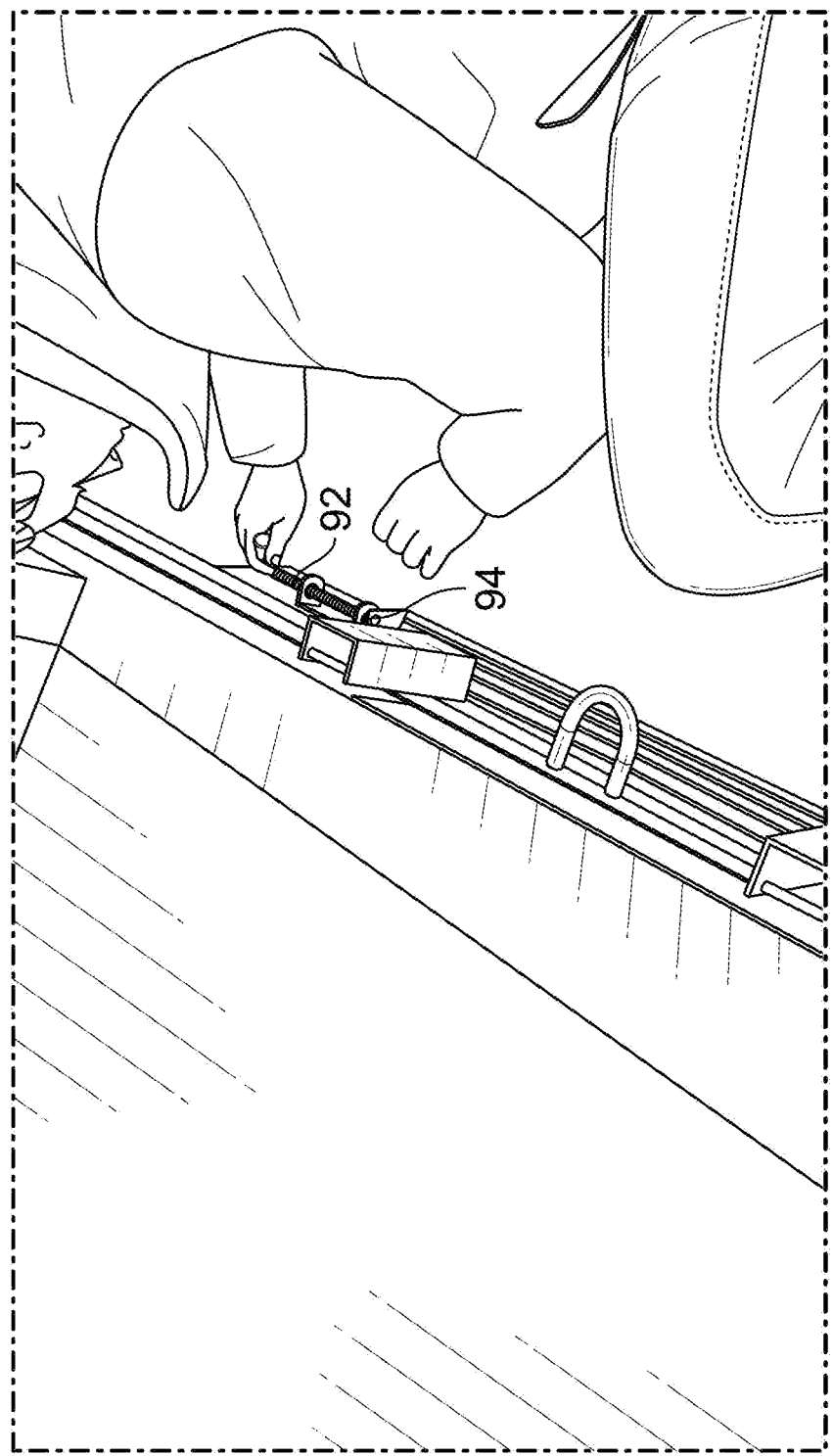
Figure 8:
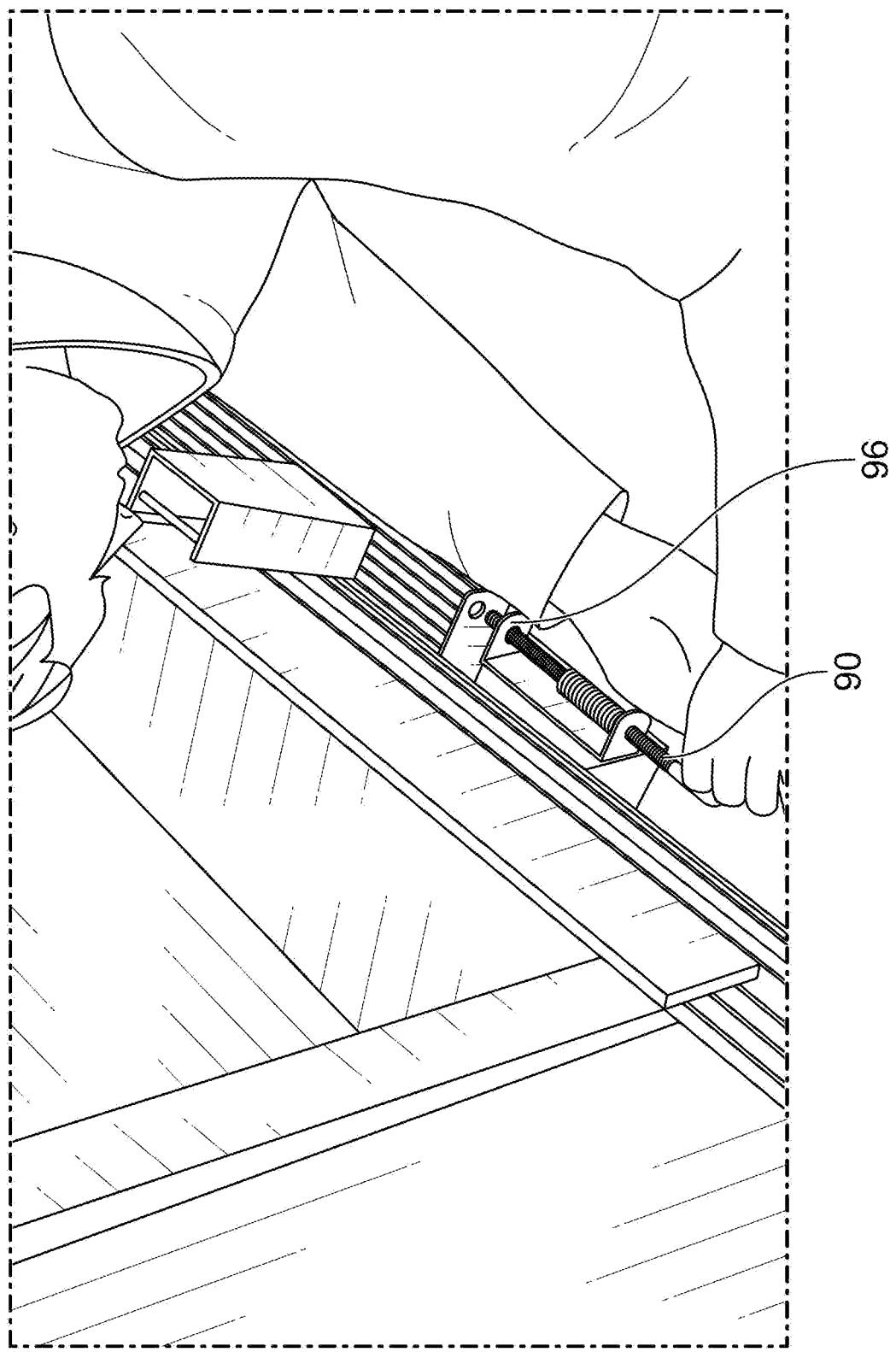

In FIGS. 6 through 8, spring-loaded, retractable pins 90, 92 are removed from a securing latches 94, 96 situated below the doors 52 adjacent the storage compartment 58.

Figure 9:
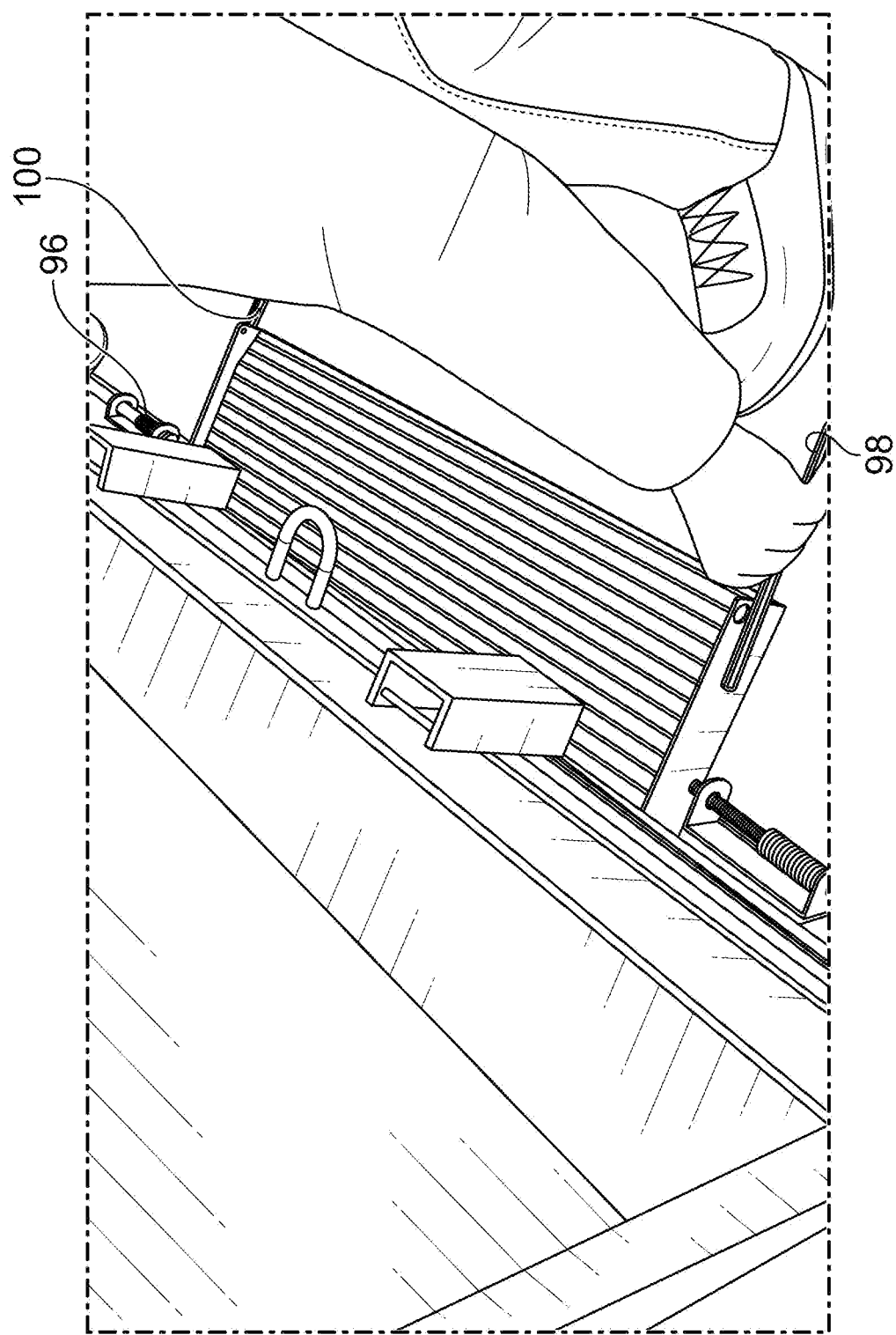

In FIG. 9, using the opposing handles 98, 100 situated at the end of the ramp 76, the ramp 76, fully stored within the storage compartment 58 of the refrigerator box 50 and in a stowaway position 86, is begun to be pulled from the storage compartment 58. In this manner, the head frame wheels 78, 80 are moveable (e.g., slide, roll, etc. . . . ) within the opposing tracks 62, 64 to allow the ramp assembly 70 to traverse or move through and out from the storage compartment 58.

Figure 10:
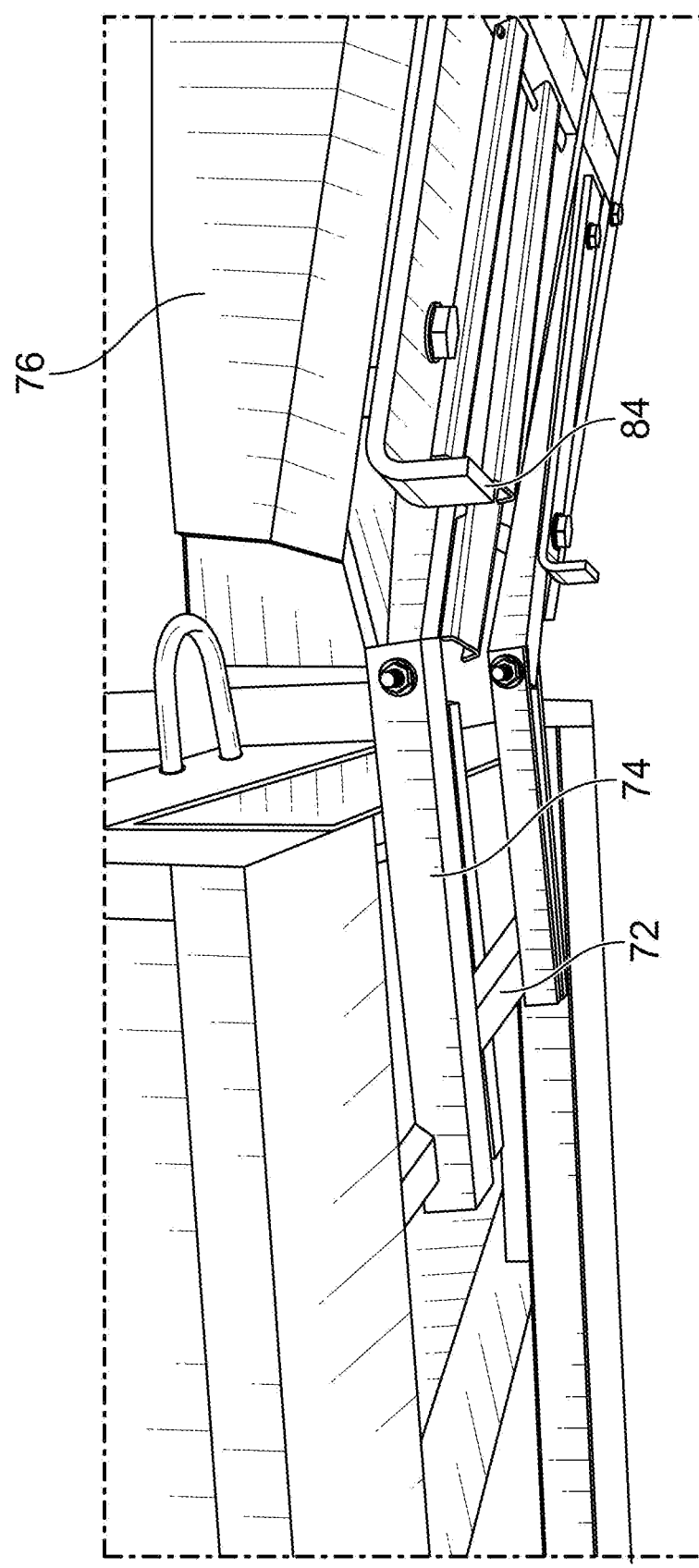
Figure 11:
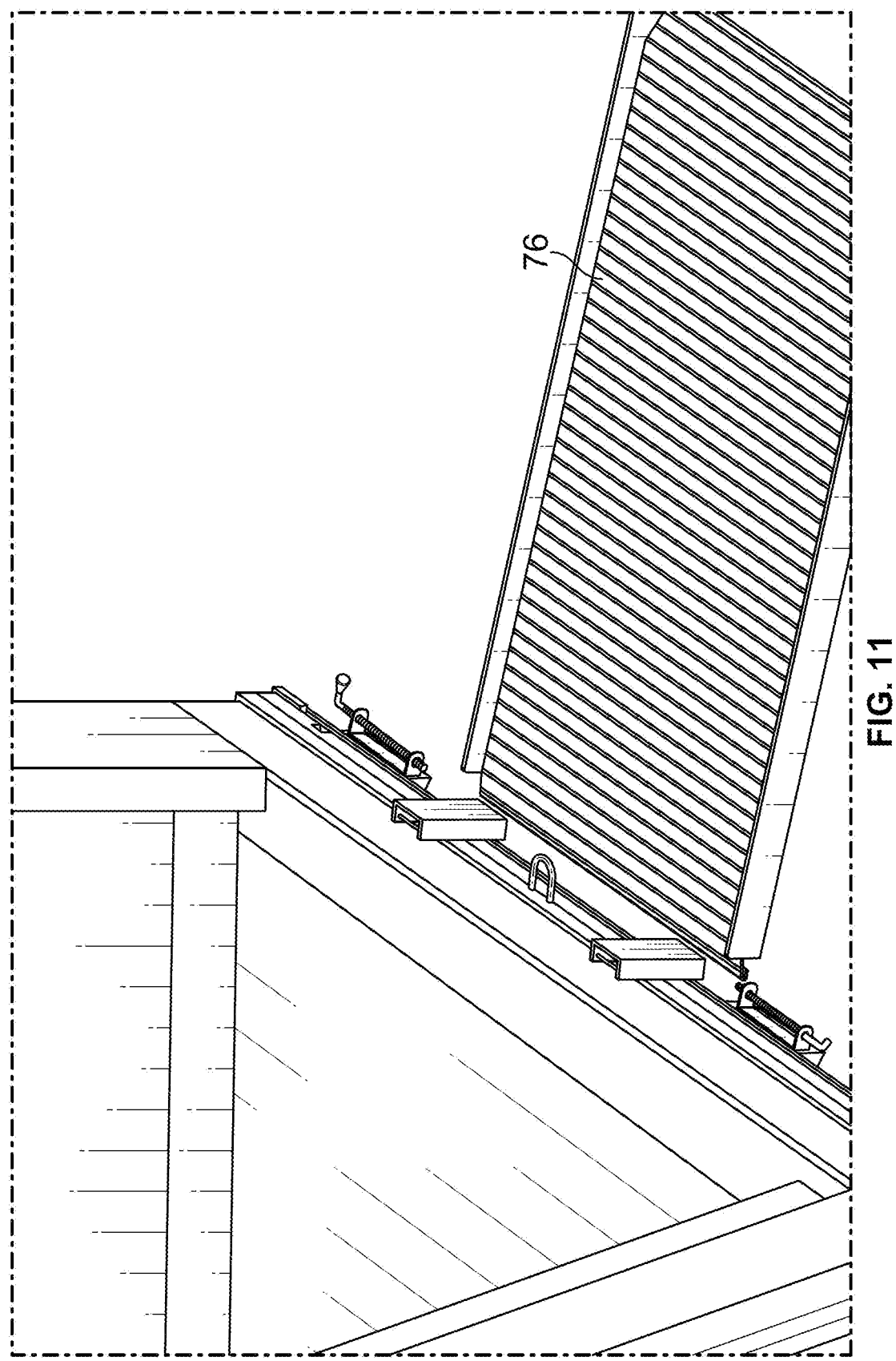

In FIGS. 10 through 11, the ramp assembly 70 is continued to traverse or move through and the storage compartment 58 until the head frame 72 engages a stop within the storage compartment 58. When this occurs, the ramp 76 will have fully exited or have been completely removed from the storage compartment 58 but remain connected to the head frame 72 and moveable in relation to the head frame 72 through the use of the articulating arms 74.

In FIGS. 12 through 15, the ramp 76 is lifted upwards and with the hooks 84, fixedly attached and extending outwardly from the bottom of the ramp 76, being inserted, dropped and/or received into the retaining members 102, 104, fixedly secured and situated below the doors 52 adjacent the storage compartment 58 to thereby hold the ramp 76 in position at the back of the refrigerator box 50 to load and unload product or contents from the refrigerator box 50. The resulting position of the ramp 76 being situated in an angled position 88.

Figure 12:
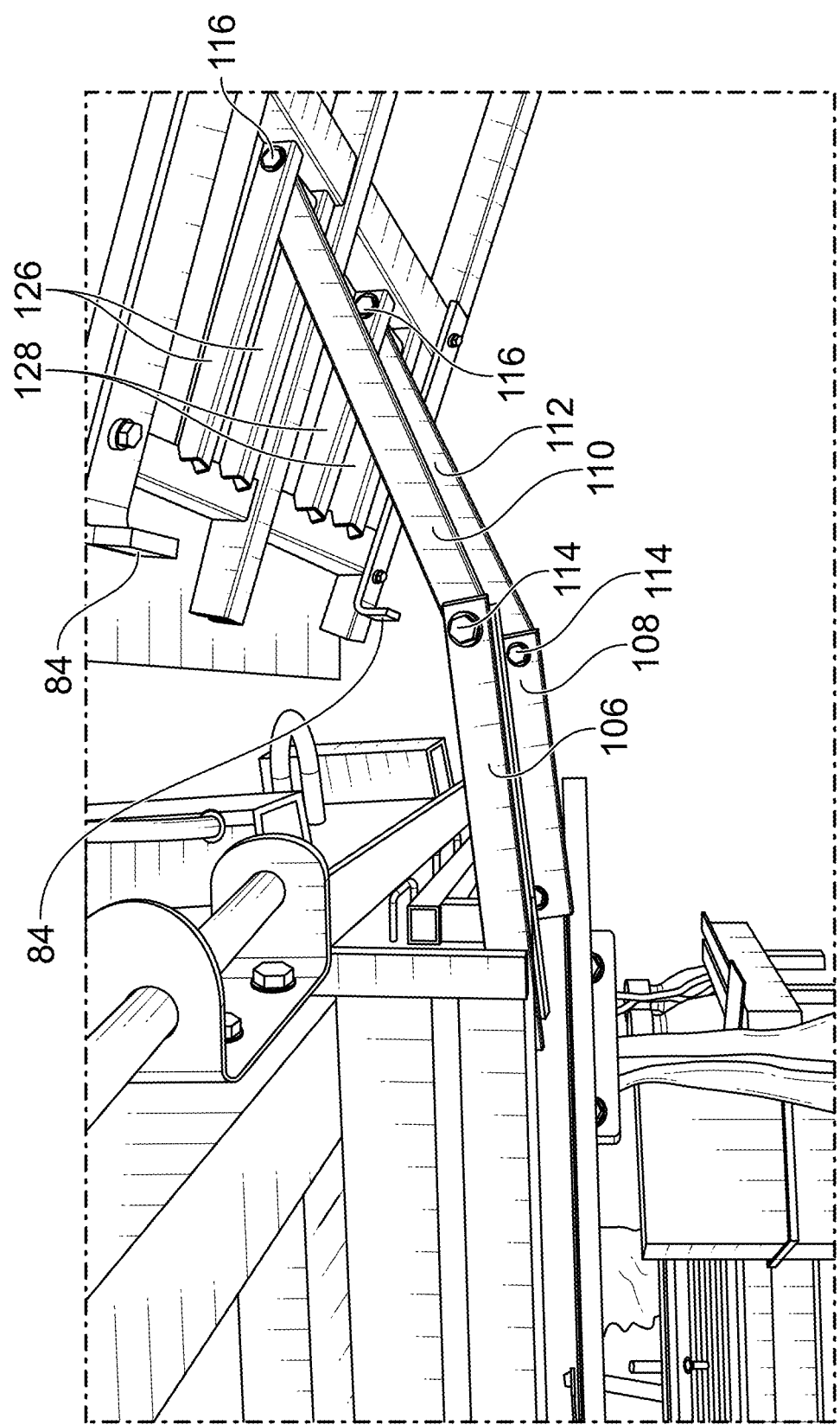
Figure 13:
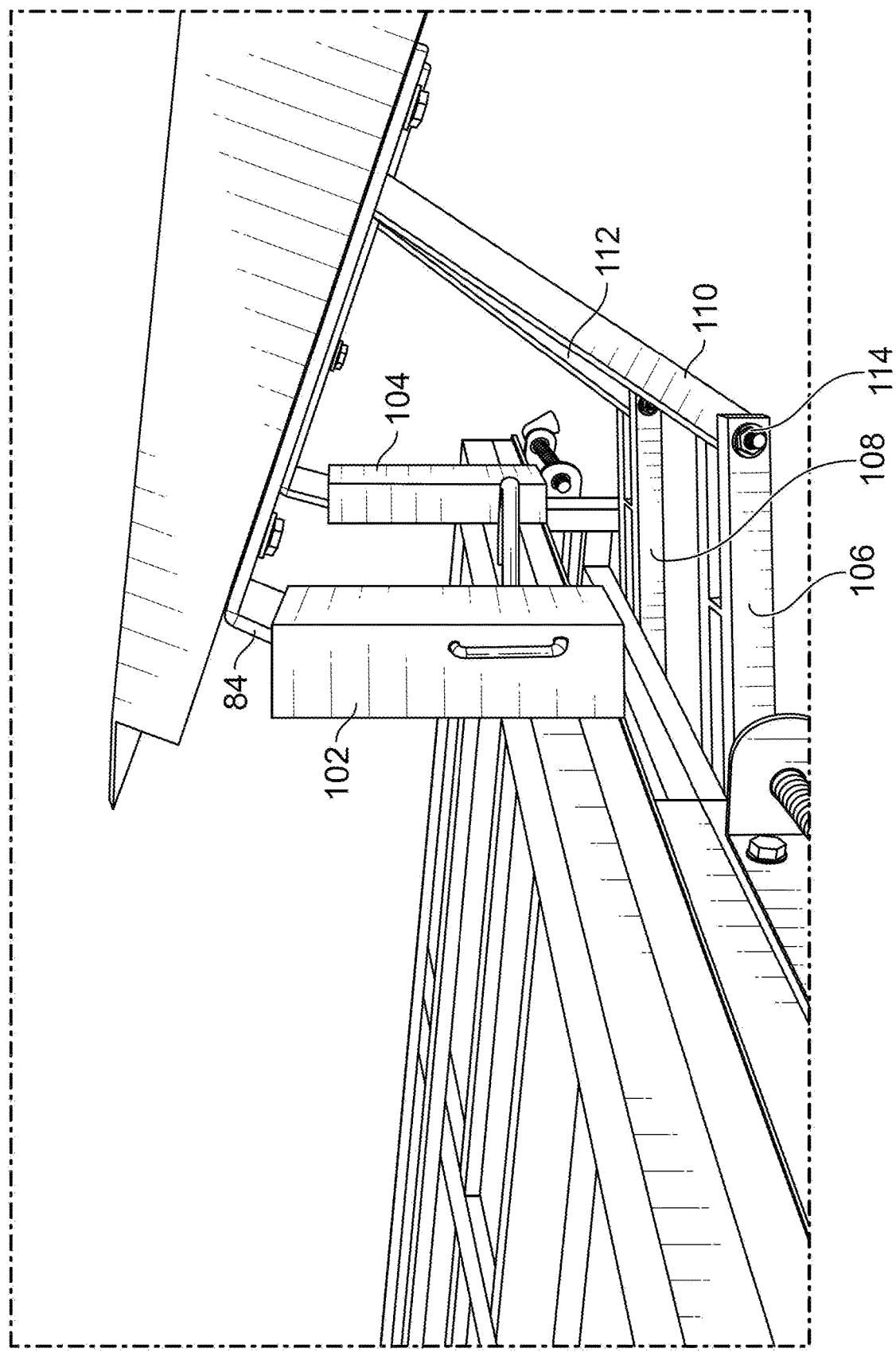
Figure 14:
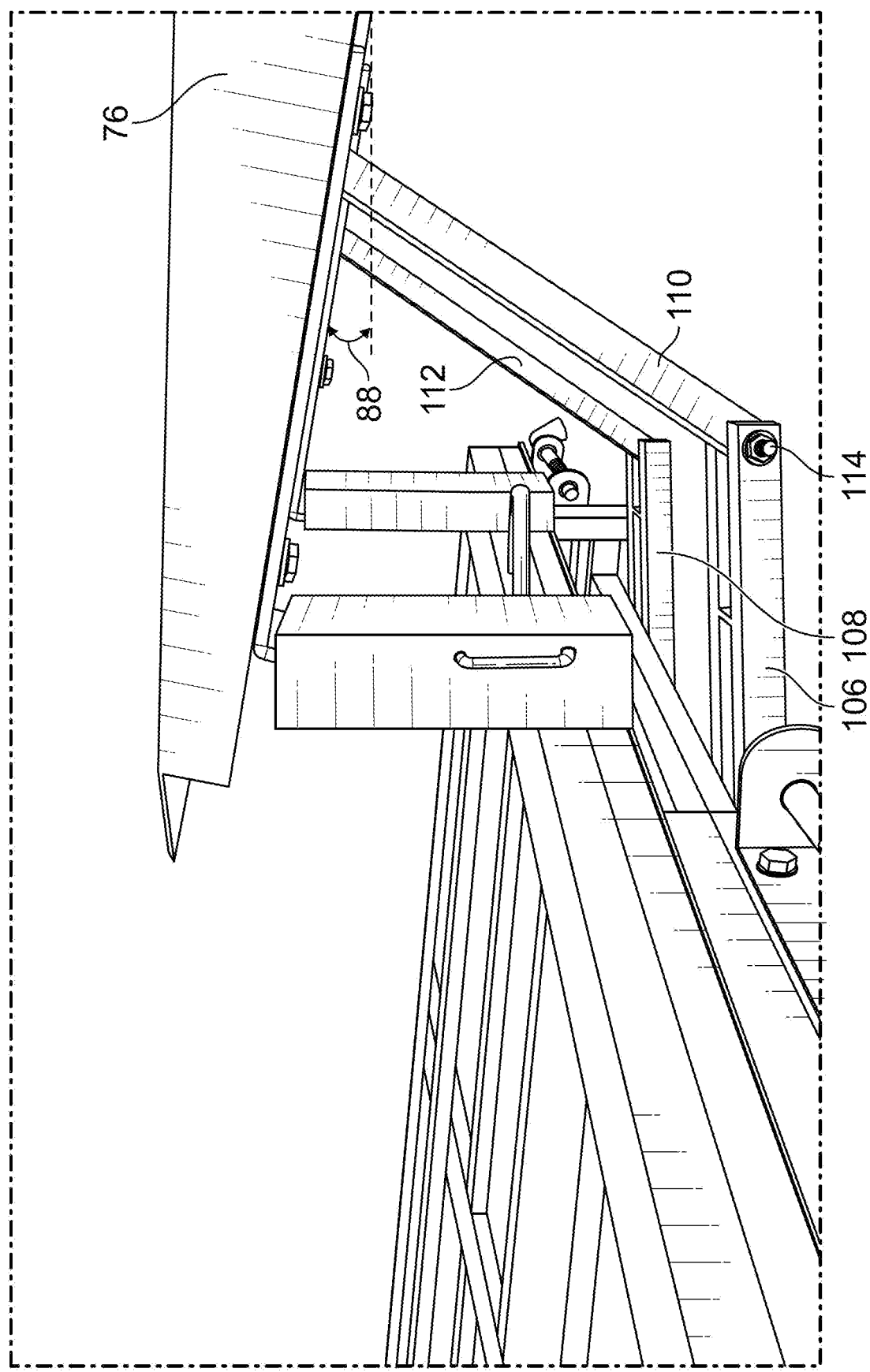
Figure 15:
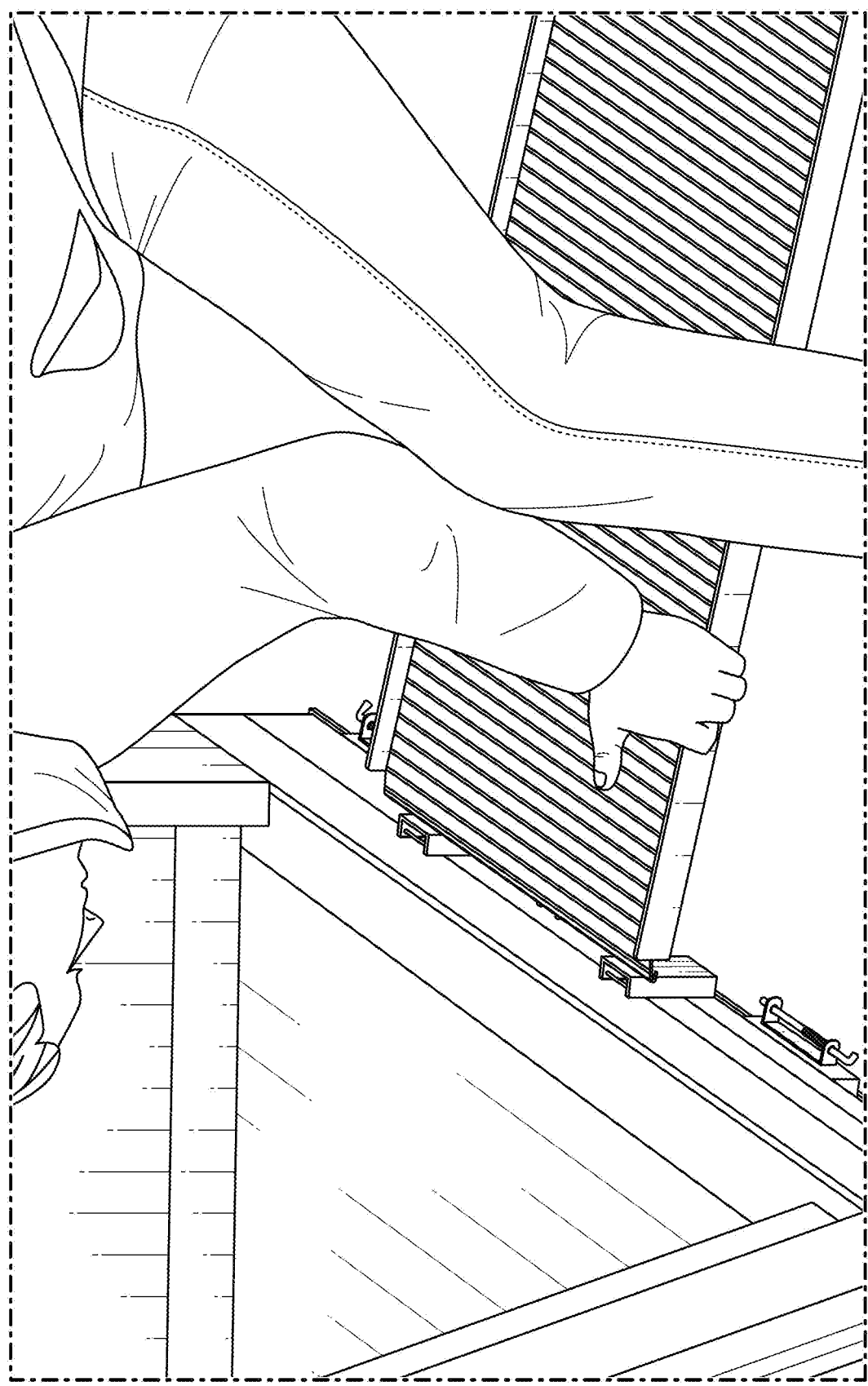

In the preferred embodiment, and referring to FIGS. 12 and 3.1, the upward motion and rotation of the ramp 76 to lift the ramp 76 for placement of the hooks 84 into the retaining members 102, 104 is facilitated by the articulating arms 74. Each of the articulating arms 74 provide first arms 106 (also referred to as the first pair of arms 122), 108 (also referred to as the second pair of arms 124), the third pair of arms 126, and the fourth pair of arms 128. The second arms 110 (also referred to as the fifth arm 130), 112 (also referred to as the sixth arm 132). The first arms 106, 108 (or the first pair of arms 122 and the second pair of arms 124) are preferably fixedly secured to the head frame 72 and pivotally connected, about a first pivot axis 114 (also referred to as the first pivot axis 140 and the third pivot axis 136), to the second arms 110, 112 (or the third pair of arms 126 and the fourth pair of arms 128). The second arms 110 (or the fifth arm 130), 112 (or the sixth arm 132) are pivotally connected, about a second pivot axis 116 (also referred to as the second pivot axis 134 and the fourth pivot axis 138), to the ramp 76. In this manner, when in use and in order for the ramp 76 to be releaseably connected to the retaining members 102, 104 requires: (1) lifting the ramp 76 in the upward direction, (2) rotating the second arms 110 (or the fifth arm 130), 112 (or the sixth arm 132) about the first pivot axis 114 (or the first pivot axis 140 and the second pivot axis 136) in relation to the first arms (or the first pair of arms 122 and the second pair of arms 124), (3) rotating the second arms (or the fifth arm 130), 112 (or the sixth arm 132) about the second pivot axis 116 (or the second pivot axis 134 and the fourth pivot axis 138) in relation to the ramp 76, and then (4) inserting, dropping and/or receiving the hooks 84 into the retaining members 102, 104.

Figure 16:
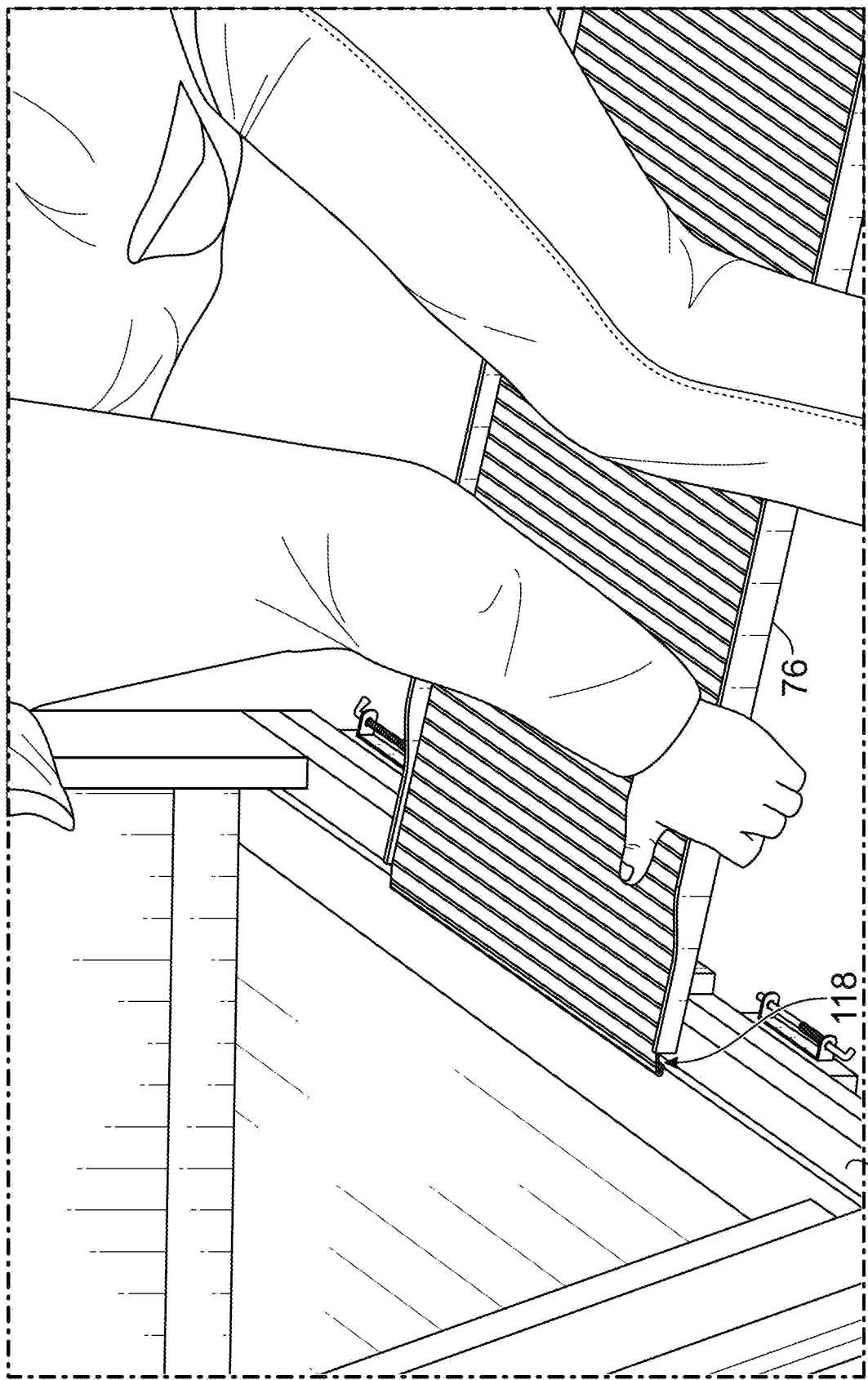

In FIG. 16, once the ramp 76 is releaseably connected to the retaining members 102, 104, a lip 118 on the ramp 76 is rested over the edge 120 of the refrigerator box 50.

Figure 17:
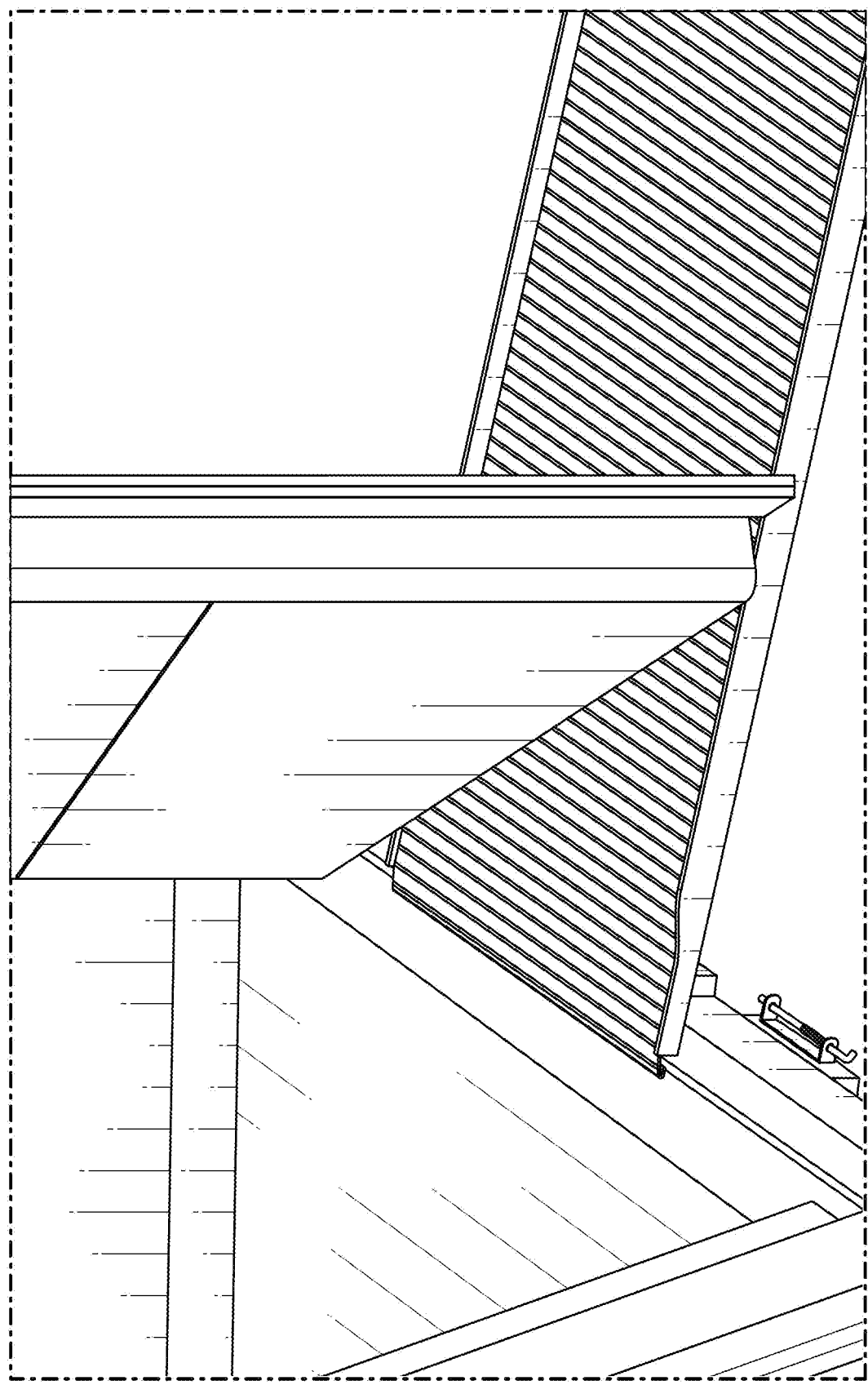
Figure 18:
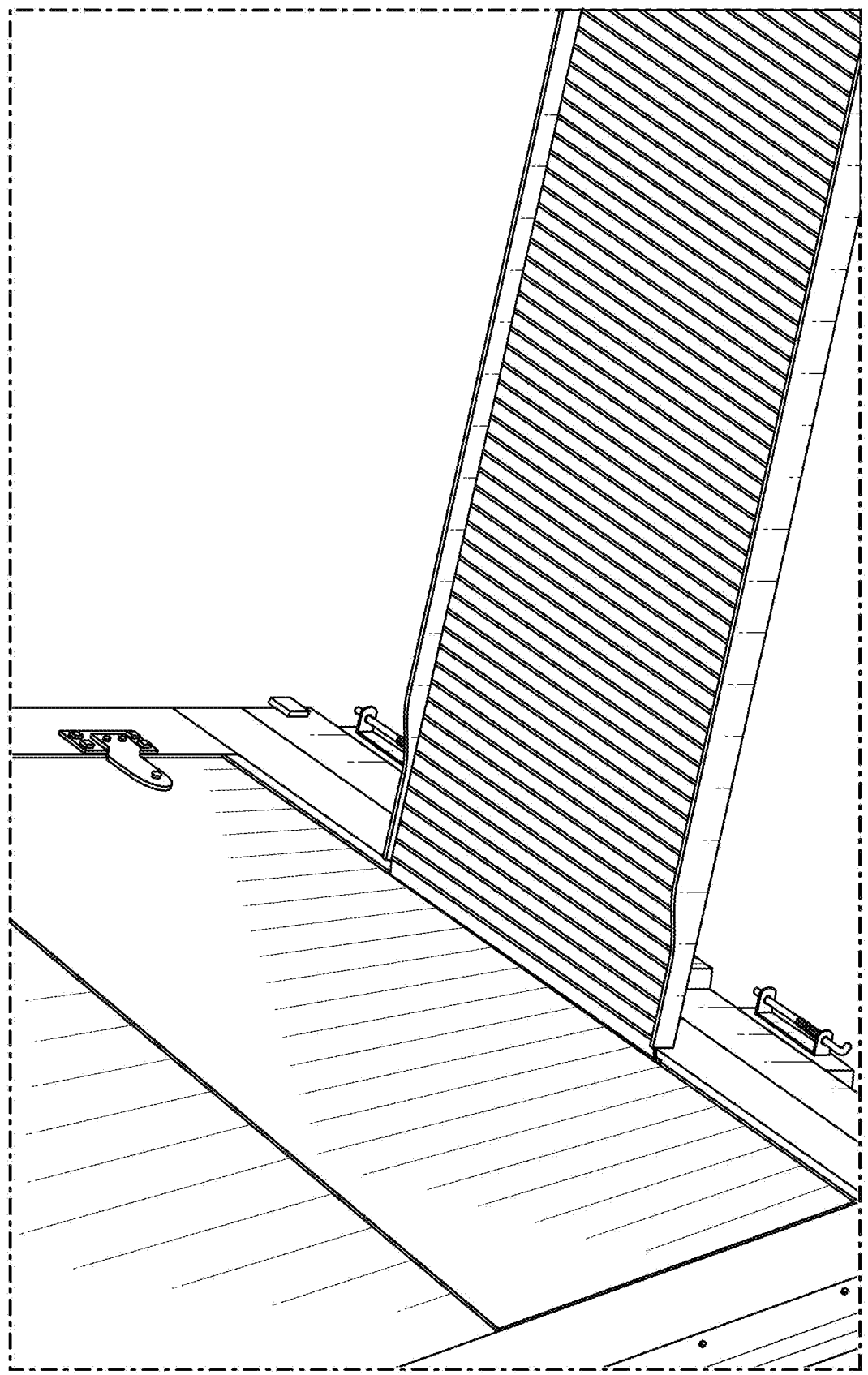
Figure 19:
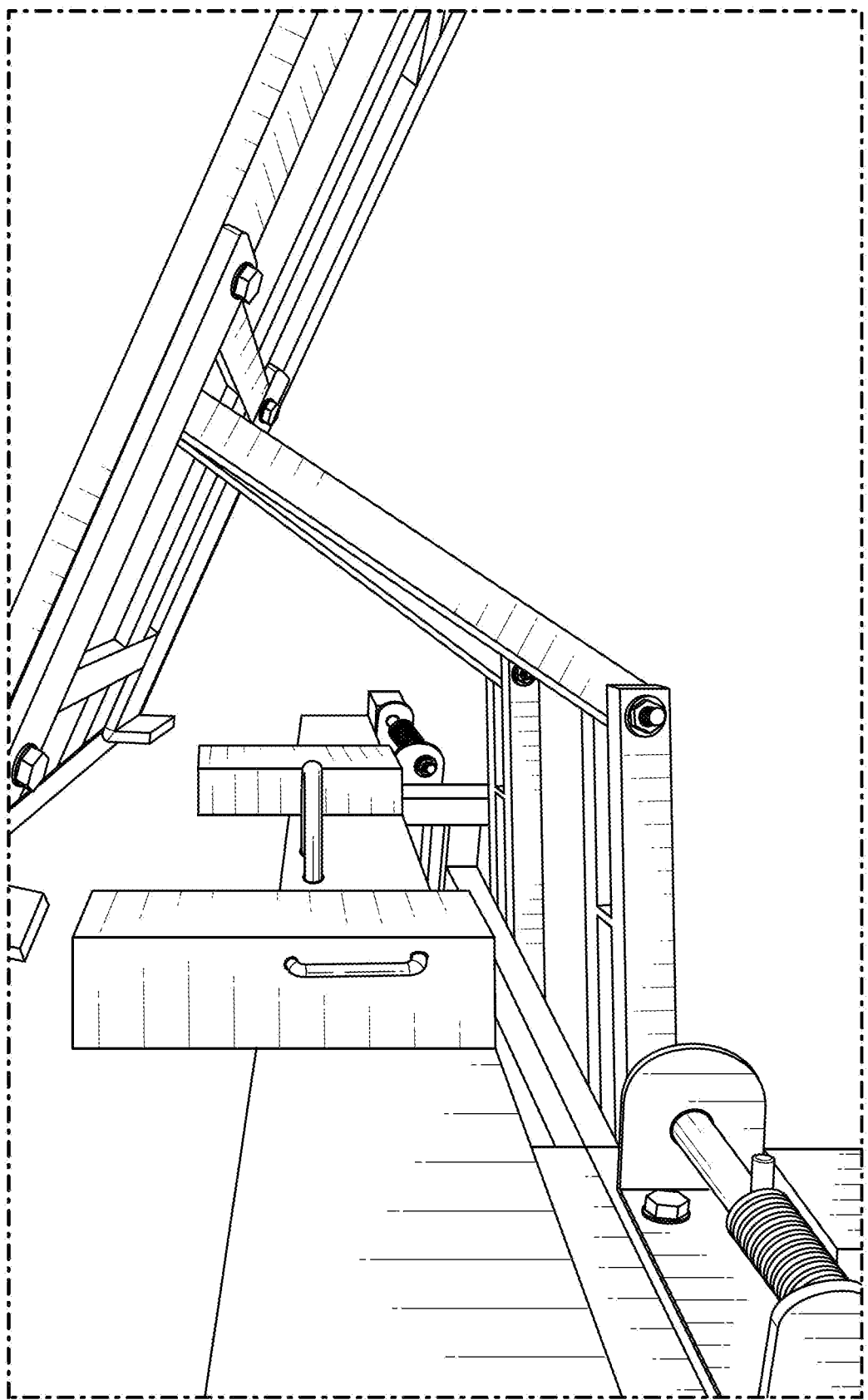
Figure 20:
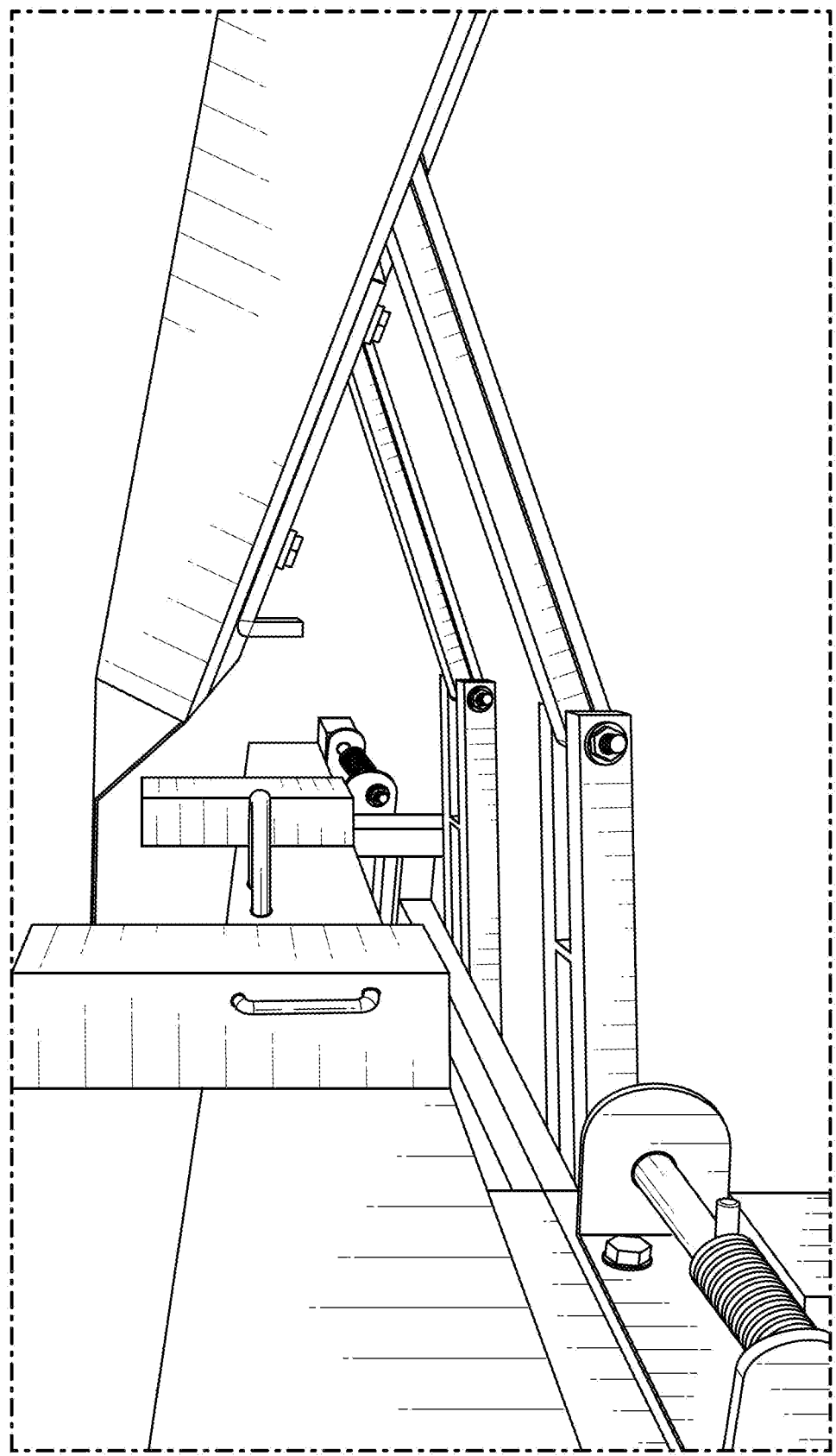
Figure 21:
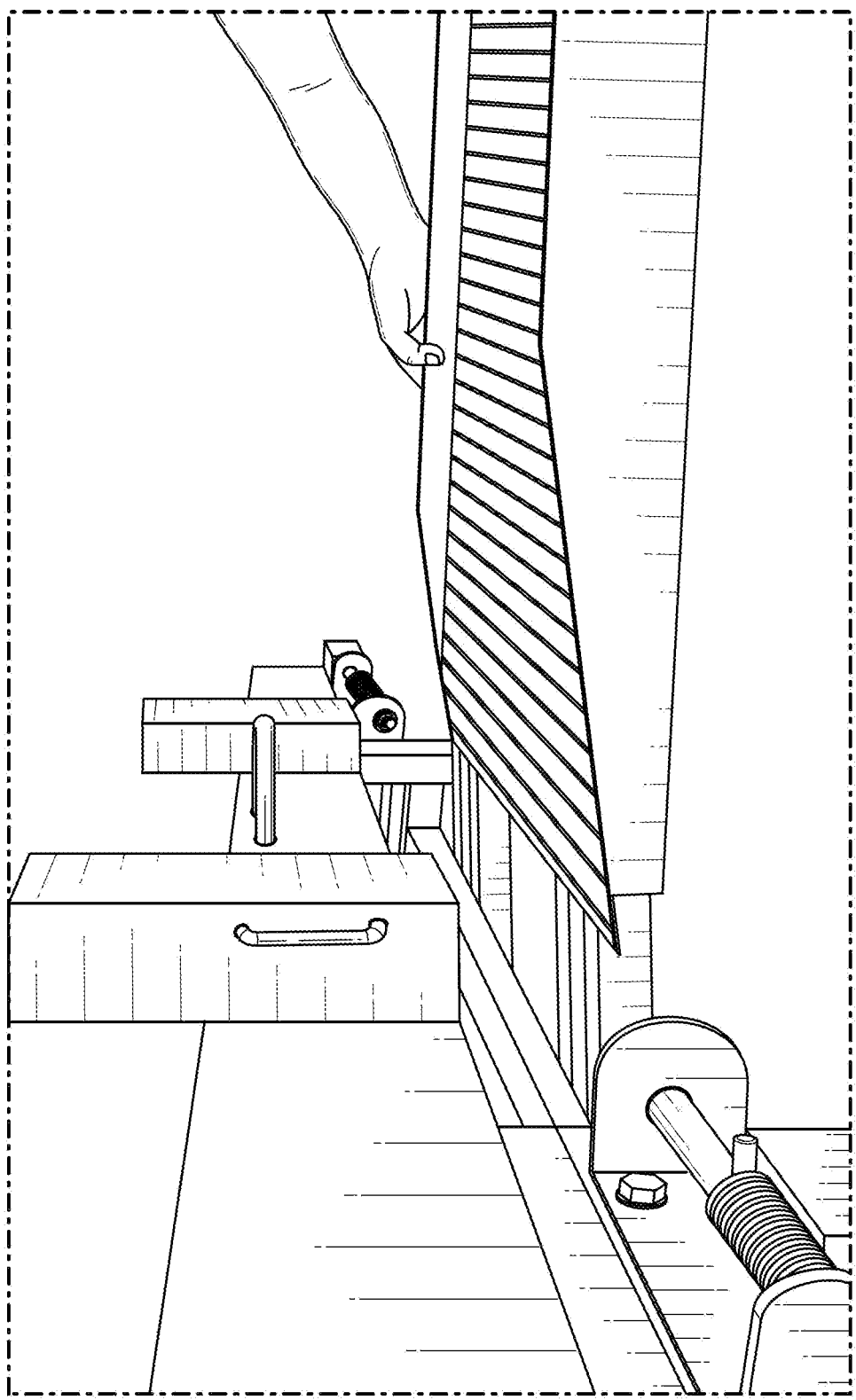
Figure 22:
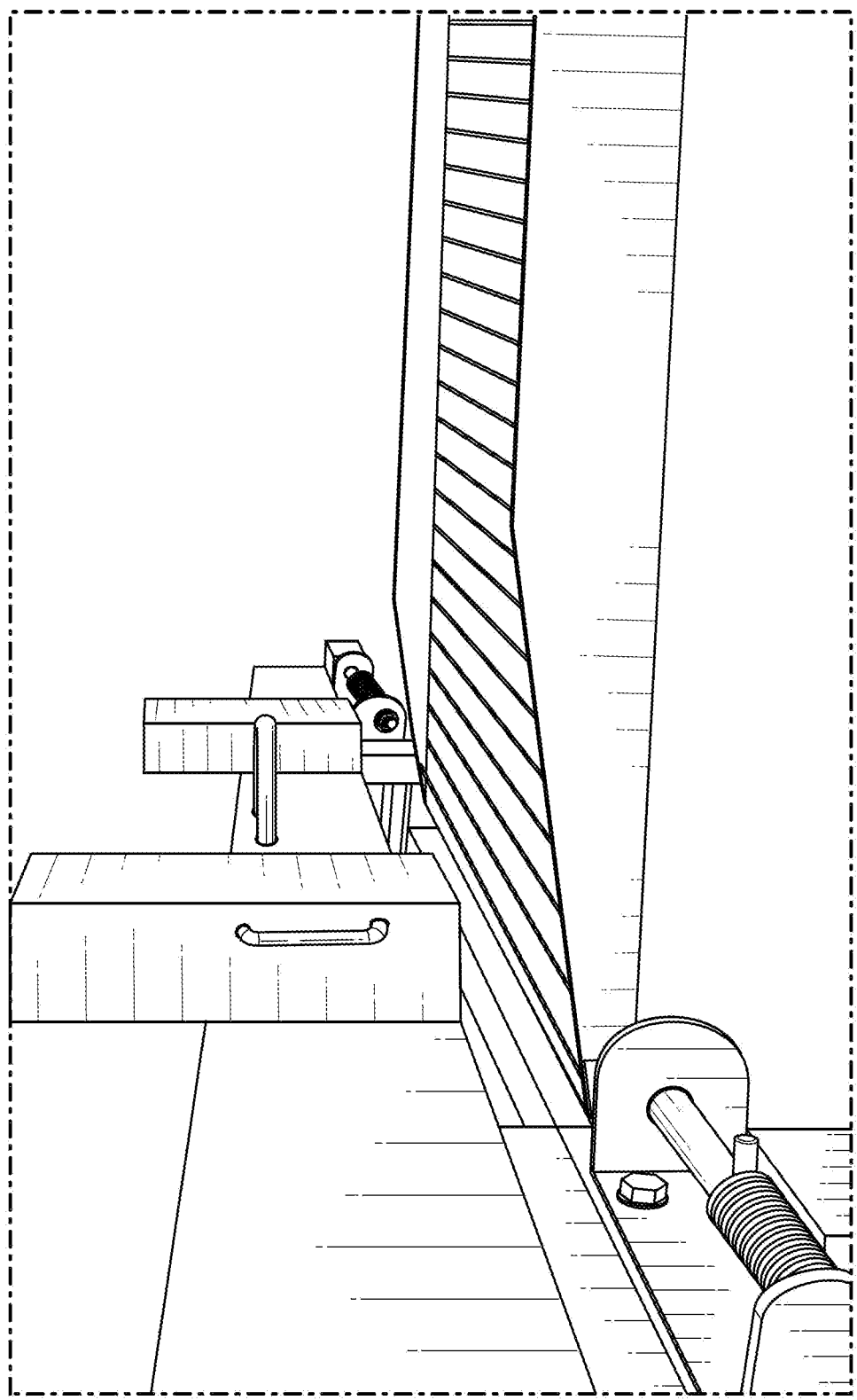
Figure 23:
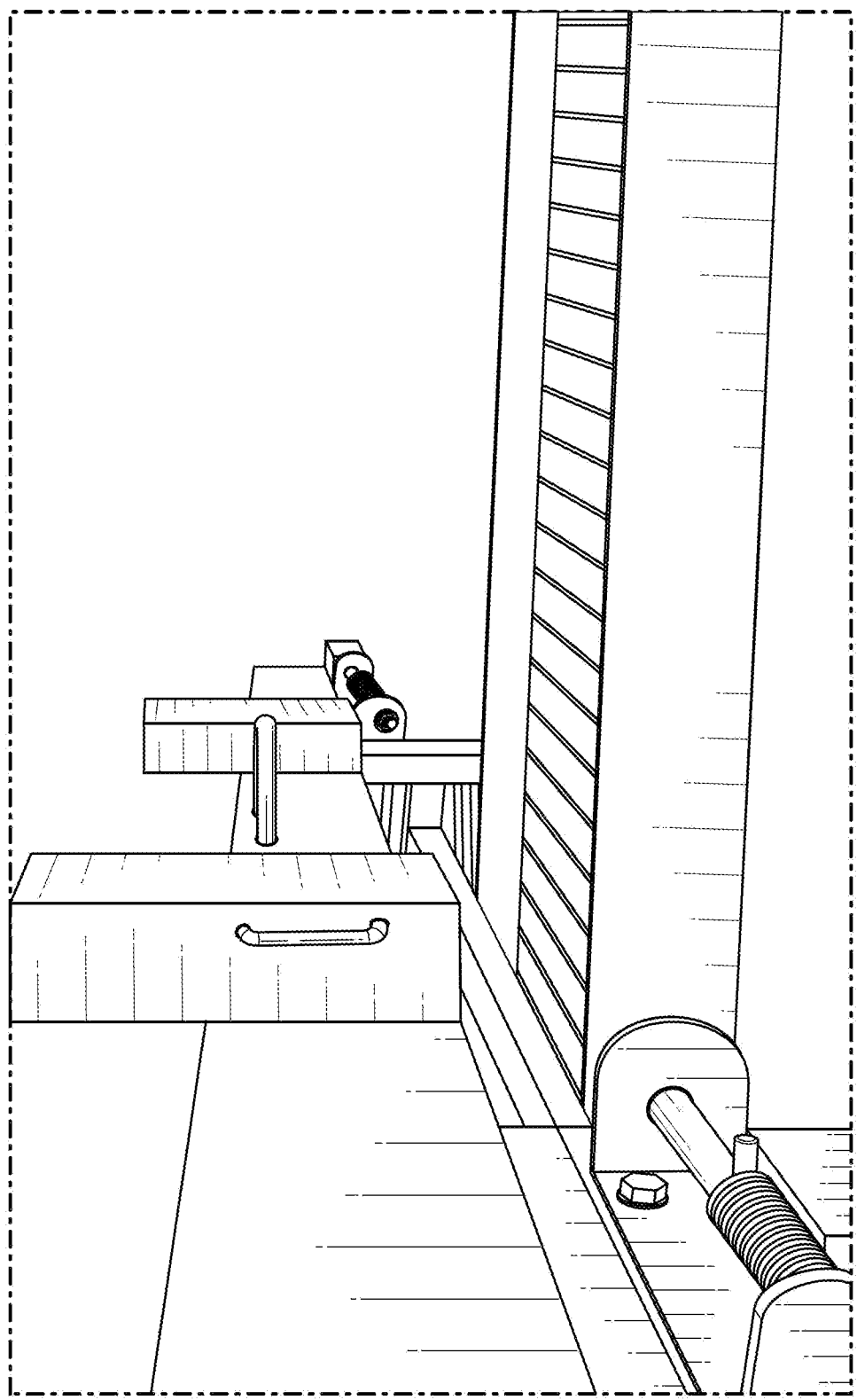
Figure 24:
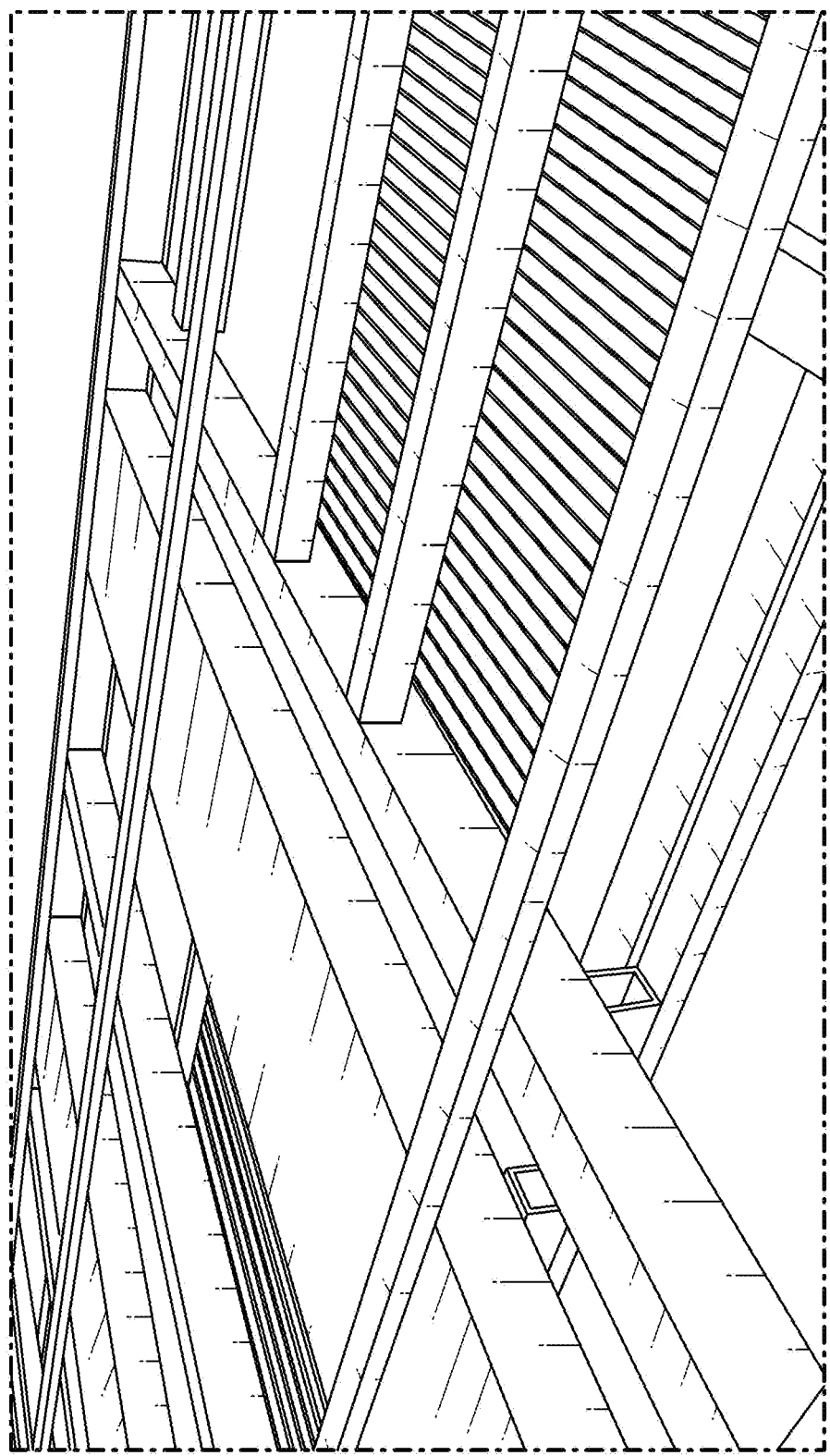

In FIGS. 17 and 18, and at this point, with the ramp 76 positioned at the angled position 88 (e.g., when the ramp assembly 70 is removed from the storage compartment 58) and situated in connection with the refrigerator box 50 below the doors 52 and behind the rear of the refrigerator box 50 (e.g., and not within the refrigerator box 50), the refrigerator box 50 and products and contents are ready for loading and unloading from the refrigerator box 50 without having to disengage the ramp 76 while the refrigerator doors 52 are being opened and closed. Thus, the refrigerator doors 52 can be opened and closed, as desired, and products and contents removed, likewise as desired, while the ramp 76 remains in continuous, uninterrupted use.

In FIGS. 19 through 24, once all of the products and contents have been removed from the refrigerator box 50 and the ramp 76 is no longer necessary, the process for returning the ramp 76 from the angled position 88 back to the stowaway position 86 within the storage compartment 58 is reversed.

Based on the foregoing, Applicant's refrigerator box 50 provides at least the following advantages:

(a) This is a stand-alone, all-in-one refrigerator box that includes refrigerator and built-in (or stowaway) ramp. This all-in-one refrigerator box may be transported on the top of a truck bed, but otherwise may have nothing to do with a truck;

(b) Attachment of the ramp to the rear of the refrigerator box (e.g., not within the box) to allow the doors to the refrigerator to be opened and closed while ramp is in use. Thus, with the ramp is not being required to be disengaged from the refrigerator box to open and close the refrigerator, this (i) prevents unnecessary opening and closing of the refrigerator and (ii) prevents loss of temperature or exchange of heat into the refrigerator to collectively thereby allow the refrigerator to keep the contents inside the refrigerator to remain at their current cooler or colder temperatures;

More specifically, the reciprocal retaining members to hold the ramp are located at the back of the refrigerator box, not inside the bed of the refrigerator box. This allows the door or doors to the refrigerator box to be freely and continuously opened and closed without having to remove the ramp; while further allowing the ramp to be used to remove the contents from the refrigerator box the entire time. This is very important as this refrigerator box is also a refrigerator and the door or doors must remain closed as much as possible.

(c) The stowaway ramp is stored within the storage compartment providing a low profile clearance or low height, and preferably may be limited to four inches (4"). In other words, the storage section that holds the head frame, articulating arms, and ramp only needs a low clearance or low height to store these when not in use;

(d) The stowaway ramp is secured within the storage compartment by the built-in, retractable, spring-loaded containment pins. In other words, the articulating arms remain connected to both the head frame and the ramp, and then permits the rotation of the articulating arms to allow the ramp (removed from the storage compartment) to be lifted for placement at the back end of the refrigerator box;

(e) The stowaway ramp has only two (2) pivot points: at the ramp and between ramp and wheel.

Thus, there has been provided a refrigerator box and method of using the same. While the invention has been described in conjunction with a specific embodiment, it is evident that many alternatives, modifications and variations will be apparent to those skilled in the art in light of the foregoing description. Accordingly, it in intended to embrace all such alternatives, modifications and variations as fall within the spirit and scope of the disclosure contained herein and appended claims.

What is claimed is:

1. A container, comprising:
a roof, a first side wall, a second side wall, and opposed end walls forming the container and defining a hollow center;
one of the opposed end walls defining a door,
a storage compartment contained within the container;
a ramp;
opposing tracks extending longitudinally within the storage compartment and each opposing track providing a top rail and a bottom rail, with each opposing track situated in longitudinal alignment with the ramp;
a head frame;
opposed frame wheels attached to the head frame and situated within the opposing tracks between the top rail and the bottom rail;
a first pair of arms with each arm of the first pair situated parallel to one another and defining a first opening between them;
the first pair of arms secured to the head frame;
a second pair of arms with each arm of the second pair situated parallel to one another and defining a second opening between them;
the second pair of arms secured to the head frame;
a third pair of arms with each arm of the third pair situated parallel to one another and defining a third opening between them;
the third pair of arms secured to the ramp;
a fourth pair of arms with each arm of the fourth pair situated parallel to one another and defining a fourth opening between them;
the fourth pair of arms secured to the ramp;
a fifth arm having opposed ends with one end situated between the first opening of the first pair of arms and defining a first pivot axis and the other end situated between the third opening of the third pair of arms and defining a second pivot axis;
a sixth arm having opposed ends with one end situated between the second opening of the second pair of arms and defining a third pivot axis and the other end situated between the fourth opening of the fourth pair of arms and defining a fourth pivot axis;
the first pair of arms, the second pair of arms, the third pair of arms, the fourth pair of arms, the fifth arm, and the sixth arm coacting to secure the ramp to the head frame;
the ramp moveable from a stowaway position through the storage compartment using the opposed frame wheels of the head frame until the head frame engages a stop within the storage compartment with the ramp being placed in a fully exited position from the storage compartment;
the ramp moveable from the fully exited position and into an angled position upon rotation of the fifth arm about both the first pivot axis and the second pivot axis and the rotation of the sixth arm about both the third pivot axis and the fourth pivot axis;
means for releasably securing the ramp to the container below the door; and
whereas, when the ramp is in the angled position, the door of the container may be continuously opened and closed to load and unload the container.

2. The container of claim 1 wherein an air-conditioning unit is releasably attached to the container to provide cool temperatures within the hollow center of the container.

3. The container of claim 1 wherein the container is provided with a plurality of wheels, the wheels permitting the container to be moved onto a truck bed or trailer for transporting the container to or from different locations for loading or unloading.

4. The container of claim 1 wherein the means for releasably securing the ramp to the container below the door comprises a retaining member fixedly secured to the container and a hook fixedly secured to the ramp.

5. A container, comprising:
the container providing an enclosure defining a hollow center and a storage compartment;
an air-conditioning unit releasably attached to the enclosure to provide cool temperatures within the hollow center of the enclosure;
a door attached to the enclosure;
a ramp;
opposing tracks extending longitudinally within the storage compartment and each opposing track providing a top rail and a bottom rail, with each opposing track situated in longitudinal alignment with the ramp;
a head frame;
opposed frame wheels attached to the head frame and situated within the opposing tracks between the top rail and the bottom rail;
a first pair of arms with each arm of the first pair situated parallel to one another and defining a first opening between them;
the first pair of arms secured to the head frame;
a second pair of arms with each arm of the second pair situated parallel to one another and defining a second opening between them;
the second pair of arms secured to the head frame;
a third pair of arms with each arm of the third pair situated parallel to one another and defining a third opening between them;
the third pair of arms secured to the ramp;
a fourth pair of arms with each arm of the fourth pair situated parallel to one another and defining a fourth opening between them;
the fourth pair of arms secured to the ramp;
a fifth arm having opposed ends with one end situated between the first opening of the first pair of arms and defining a first pivot axis and the other end situated between the third opening of the third pair of arms and defining a second pivot axis;
a sixth arm having opposed ends with one end situated between the second opening of the second pair of arms and defining a third pivot axis and the other end situated between the fourth opening of the fourth pair of arms and defining a fourth pivot axis;
the first pair of arms, the second pair of arms, the third pair of arms, the fourth pair of arms, the fifth arm, and the sixth arm coacting to secure the ramp to the head frame;
the ramp moveable from a stowaway position through the storage compartment using the opposed frame wheels of the head frame until the head frame engages a stop within the storage compartment with the ramp being placed in a fully exited position from the storage compartment;
the ramp moveable from the fully exited position and into an angled position upon rotation of the fifth arm about both the first pivot axis and the second pivot axis and the rotation of the sixth arm about both the third pivot axis and the fourth pivot axis;

means for releasably securing the ramp to the container below the door; and whereas, when the ramp is in the angled position, the door of the container may be continuously opened and closed to load and unload the container.

6. The container of claim 5 wherein the means for releasably securing the ramp to the container below the door comprises a retaining member fixedly secured to the container and a hook fixedly secured to the ramp.

7. The container of claim 5 wherein the container is provided with a plurality of wheels, the wheels permitting the container to be moved onto a truck bed or trailer for transporting the container to or from different locations for loading or unloading.

\* \* \* \* \*